(12) United States Patent
Alfaro

(10) Patent No.: US 6,296,343 B1
(45) Date of Patent: *Oct. 2, 2001

(54) EDGE ENHANCEMENT DEPLETION TECHNIQUE FOR OVER-SIZED INK DROPS TO ACHIEVE HIGH RESOLUTION X/Y AXES ADDRESSABILITY IN INKJET PRINTING

(75) Inventor: Victor Alfaro, Sant Cugat del Vallès (ES)

(73) Assignee: Hewlett-Packard Company, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/734,324

(22) Filed: Oct. 21, 1996

(51) Int. Cl.[7] .................................................. B41J 2/21
(52) U.S. Cl. .................................... 347/43; 358/1.18
(58) Field of Search ............................. 347/43, 15, 9, 347/19; 358/515, 517, 296, 447; 395/117

(56) References Cited

U.S. PATENT DOCUMENTS

| | | | |
|---|---|---|---|
| 5,241,396 | * 8/1993 | Harrington | 358/296 |
| 5,371,531 | * 12/1994 | Rezanka et al. | 347/43 |
| 5,387,976 | * 2/1995 | Lesniak | 347/19 |
| 5,440,407 | * 8/1995 | Overton | 358/447 |
| 5,541,625 | * 7/1996 | Holstun et al. | 347/5 |
| 5,633,662 | * 5/1997 | Allen et al. | 347/15 |
| 5,661,507 | * 8/1997 | Sperry | 347/9 |
| 5,706,414 | * 1/1998 | Pritchard | 395/117 |

* cited by examiner

Primary Examiner—Thinh Nguyen

(57) ABSTRACT

A swath printing system such as multi-color inkjet printing which uses slower resolution printheads of at least 300 dpi nozzle spacing to achieve high resolution output of an least 600 dpi addressability in both the X (media advance) and Y (carriage scan) axes. Synchronized depletion masks for area fills and edge enhancement is provided which is plot independent and prevents drop overlap. It is especially suited for multi-pass print modes since each row has a balanced number of pixels, and there are no rows which have no "on" pixels. The depletion includes separate depletion masks and rules for edge enhancement as compared to area fills. Each color plant is depleted separately, but subject to the same depletion rules and masks. A separate depletion step provides for narrowing the vertical and horizontal dimensions of the figure to be printed.

19 Claims, 26 Drawing Sheets

FOUR PASS MEDIA ADVANCED

MULTI-PASS CLUSTER MODE FOR DEPLETED AREA FILL

600 DPI IMAGE PRINTED ON A 600 DPI RESOLUTION DEVICE

BITMAP AFTER THE NARROW PROCESS

BITMAP AFTER NARROW PROCESS + COLOR GRID

DEPLETED BITMAP

DEPLETED BITMAP + CONTOURS OF 1/300" DROPS

DEPLETED BITMAP PRINTED ON A 600 DPI ADDRESSABILITY DEVICE

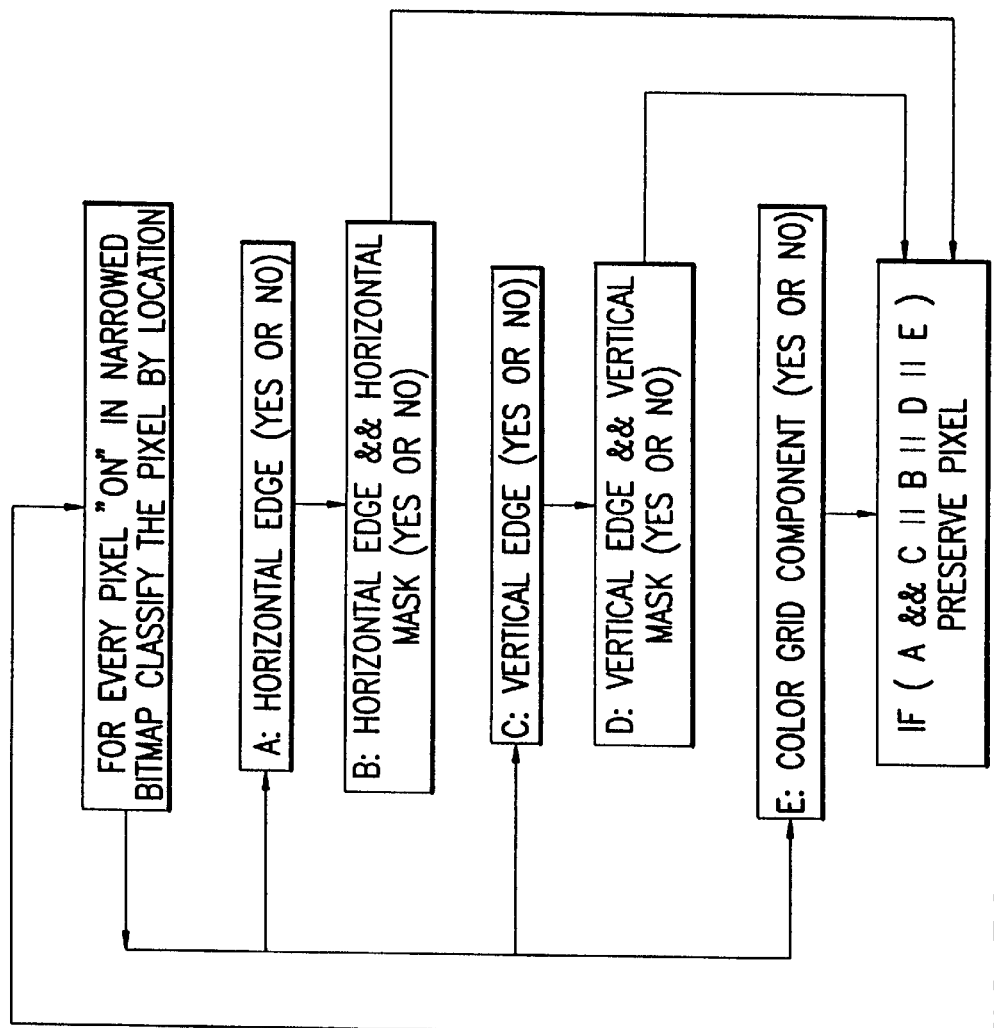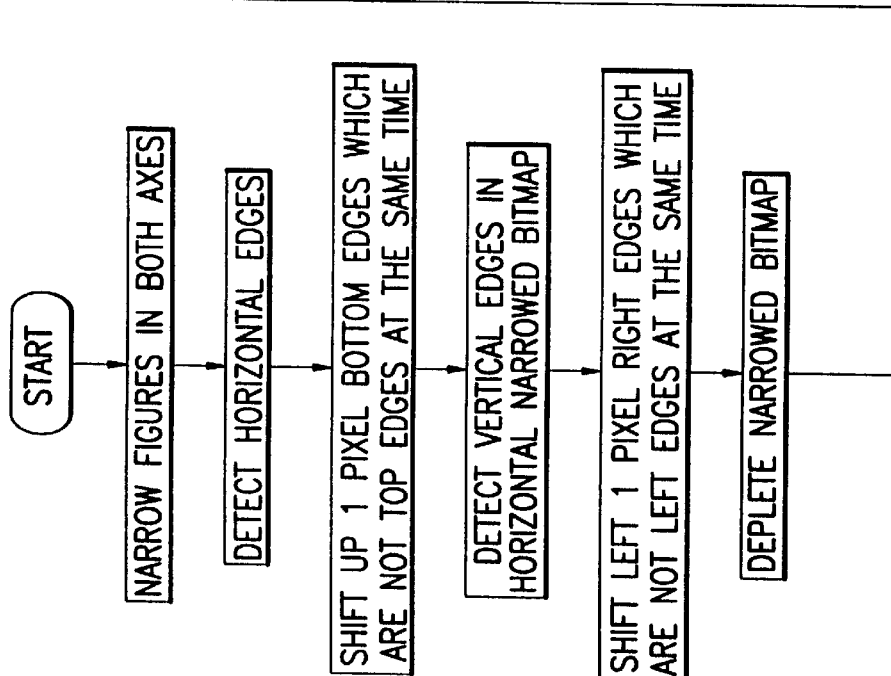
FIG. 30

EDGE ENHANCEMENT DEPLETION TECHNIQUE FOR OVER-SIZED INK DROPS TO ACHIEVE HIGH RESOLUTION X/Y AXES ADDRESSABILITY IN INKJET PRINTING

RELATED APPLICATIONS

This application is related to the following applications which are all assigned to the assignee of the present invention, and which are incorporated herein by reference U.S. Ser. No. 08/734,326 filed Oct. 21, 1996 by Victor Alfaro entitled COLOR INKJET DEPLETION TECHNIQUE FOR OVER-SIZED INK DROPS TO ACHIEVE HIGH RESOLUTION X/Y AXES ADDRESSABILITY; U.S. Ser. No. 08/734,227 filed Oct. 21, 1996 by Victor Alfaro entitled EXTERNAL DIMENSION INTEGRITY FOR HIGH RESOLUTION ADDRESSABILITY IN COLOR INKJET PRINTING; U.S. Ser. No. 08/731,814 filed Oct. 21, 1996 by Alex Roche, Jordi Gonzalez, Victor Alfaro, Carlos Miranda, and Christina Estabillo entitled MULTI-COLOR SWATH PRINTING USING LOWER RESOLUTION INKJET PRINTHEADS TO ACHIEVE HIGH RESOLUTION X/Y AXES ADDRESSABILITY; and U.S. Ser. No. 08/731,815 filed Oct. 21, 1996 entitled PLOT-INDEPENDENT AREA FILL DEPLETION TECHNIQUE FOR HIGH RESOLUTION X/Y AXES ADDRESSABILITY IN INKJET PRINTING.

BACKGROUND OF THE INVENTION

This invention relates generally to swath printing, and more particularly to inkjet printers using separate nozzle arrays for each different color ink.

While much research and development has been directed toward increasing the nozzle resolution on inkjet printheads as the best way to improve print quality, some benefits can also be obtained through print mode techniques. Higher resolution addressability has already been obtained to some degree with monochrome print mode techniques. Examples of this are found in U.S. Pat. No. 5,541,625 issued Jul. 30, 1996 for METHOD FOR INCREASED PRINT RESOLUTION IN THE CARRIAGE SCAN AXIS OF AN INKJET PRINTER; U.S. Pat. No. 5,469,198 issued Nov. 21, 1995 entitles MULTIPLE PASS PRINTING FOR ACHIEVING INCREASED PRINT RESOLUTION; and U.S. Pat. No. 5,535,307 issued Jul. 9, 1996 entitled PRINTING OF VARIABLE DOT SIZES DEPENDENT UPON IMAGE DENSITY FOR IMPROVED GRAPHICS.

The monochrome techniques for increased addressable resolution, and the related depletion techniques, are not easy to apply to color printing, particularly where the goal is to have increased resolution in both the X and Y axes (media advance and carriage scan axes, respectively) as generally labeled for wide format printers/plotters.

An increased color resolution printer from Epson was introduced which provided some color depletion after increasing addressable resolution to 720×720. This product was unfortunately based on a very low nozzle resolution printhead of 90 dpi, which required a slow tedious eight pass print mode as well as special media to decrease ink dot gain.

So there still remains a need for a faster increased resolution higher resolution print technique which includes improved dot depletion to assure better print quality for a wider selection of media.

BRIEF SUMMARY OF THE INVENTION

The invention provides a swath printing system such as multi-color inkjet printing which uses lower resolution printheads of at least 300 dpi nozzle spacing to achieve high resolution output of at least 600 dpi addressability in both the X (media advance) and Y (carriage scan) aces.

Increased resolution is achieved in the X axis in a first embodiment by printing on a first carriage pass a first set of color ink drops onto a first group of pixel rows spaced apart at the lower resolution distance (e.g., $\frac{1}{300}$ inch) and extending longitudinally in the Y axis direction, advancing the media to re-position the nozzles, and then printing on a second carriage pass a second set of ink drops onto a second group of different pixel rows also spaced apart at the lower resolution distance and extending longitudinally in the Y axis direction, with the second group of pixel rows interlaced between the first group of pixel rows. A related feature of the invention is to advance the media in a preferred four pass print mode, with even and odd numbered pixel rows being printed on alternate swaths based on advancing the media different distances between each swath.

A second embodiment provides increased resolution in the X axis by the offset positioning of two printheads of the same color ink with their respective nozzles mis-aligned in the Y axis direction so that both the aforesaid first and second group of interlaced pixel rows can be printed on the same carriage pass, the first group by nozzles of one printhead and the second group by nozzles of the other.

Increased resolution is provided in the Y axis in a first embodiment having a single printhead for each color by any of the following:

1) maintaining the same carriage speed and the same firing frequency for the printhead, and printing on a first carriage pass a first set of color drops onto a first group of pixel columns spaced apart at the lower resolution distance (e.g., $\frac{1}{300}$ inch) and extending in the X axis direction, and then printing on a second carriage pass a second set of ink drops onto a second group of different pixel columns also spaced apart at the lower resolution distance and extending to the X axis direction, with the second group of pixel columns interlaced between the first group of pixel columns;

2) maintaining the same carriage speed but doubling the firing frequency for the printhead, so that both the aforesaid first and second group of interlaced pixel columns can be printed on the same carriage pass; or 3) moving the carriage at half the usual speed, but maintaining the same firing frequency for the printhead, so that both the aforesaid first and second group of interlaced pixel columns can be printed on the same carriage pass.

Increased resolution is provided in the Y axis in a second embodiment by having two printheads for each color offset in the X axis direction so that both the aforesaid first and second group of interlaced pixel rows can be printed on the same carriage swath.

A further feature of the invention is the use of a plot-independent depletion mask for area fills which improves print quality.

Synchronized depletion masks for area fills and edge enhancement are provided which are plot independent and prevent drop overlap. It is especially suited for multi-pass print modes since each row has a balanced number of pixels, and there are no rows which have no "on" pixels. The depletion includes separate depletion masks and rules for edge enhancement as compared to area fills. Each color plane is depleted separately, but subject to the same depletion rules and masks. A separate depletion step provides for narrowing the vertical and horizontal dimensions of the figure to be printed.

BRIEF DESCRIPTION OF THE DRAWINGS

FIG. 30 is a self-explanatory flow chart for the representations of FIGS. 24–29.

DETAILED DESCRIPTION OF EXEMPLARY EMBODIMENTS OF THE INVENTION

Figure 1A:
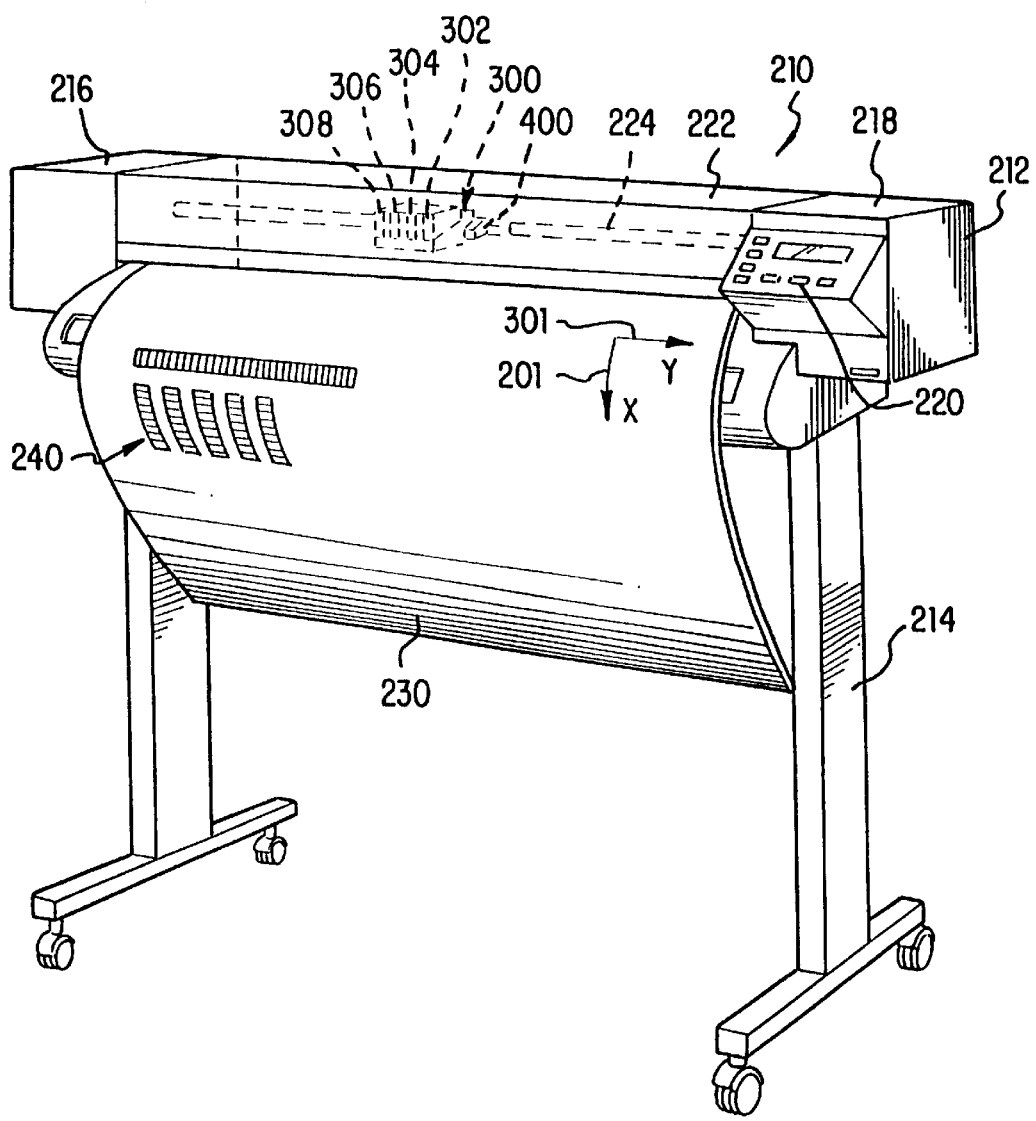
FIG. 1A is a perspective view of a large format inkjet printer/plotter capable of incorporating the features of the present invention.
Figure 1B:
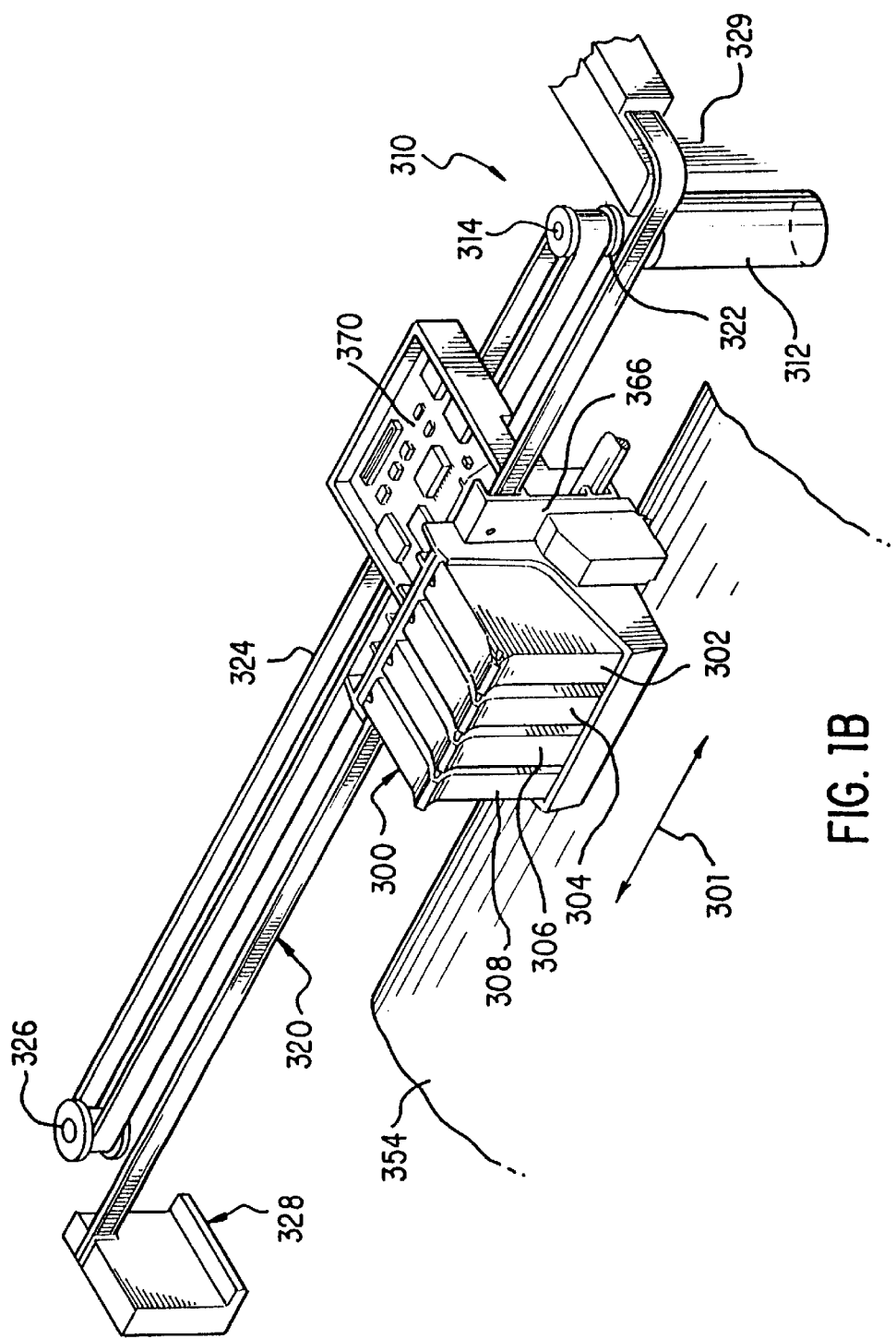
FIG. 1B is a close-up view of the carriage mechanism of the printer/plotter of FIG. 1A.

A typical embodiment of the invention is exemplified in a large format color inkjet printer/plotter as shown in FIGS. 1A–1B. More specifically, FIG. 1A is a perspective view of an inkjet printer/plotter 210 having a housing 212 mounted on a stand 214. The housing has left and right drive mechanism enclosures 216, 218. A control panel 220 is mounted on the right enclosure 218. A carriage assembly 300, illustrated in phantom under a cover 222, is adapted for reciprocal motion along a carriage bar 224, also shown in phantom. The position of the carriage assembly 300 in a horizontal or carriage scan axis is determined by a carriage positioning mechanism 310 with respect to an encoder strip 320 (see FIG. 1B). A print medium 330 such as paper is positioned along a vertical or media axis by a media axis drive mechanism (not shown). As used herein the media axis is called the X axis denoted as 201, and the carriage scan axis is called the Y axis denoted as 301.

FIG. 1B is a perspective view of the carriage assembly 300, the carriage positioning mechanism 310 anmd the encoder strip 320. The carriage positioning mechanism 310 includes a carriage position motor 312 which has a shaft 314 which drives a belt 324 which is secured by idler 326 and which is attached to the carriage 300.

The position of the carriage assembly in the scan axis is determined precisely by the encoder strip 320. The encoder strip 320 is secured by a first stanchion 328 on one end and a second stanchion 329 on the other end. An optical read 366 is disposed on the carriage assembly and provides carriage position signals which are utilized by the invention to achieve optimal image resistration in the manner described below.

Figure 2:
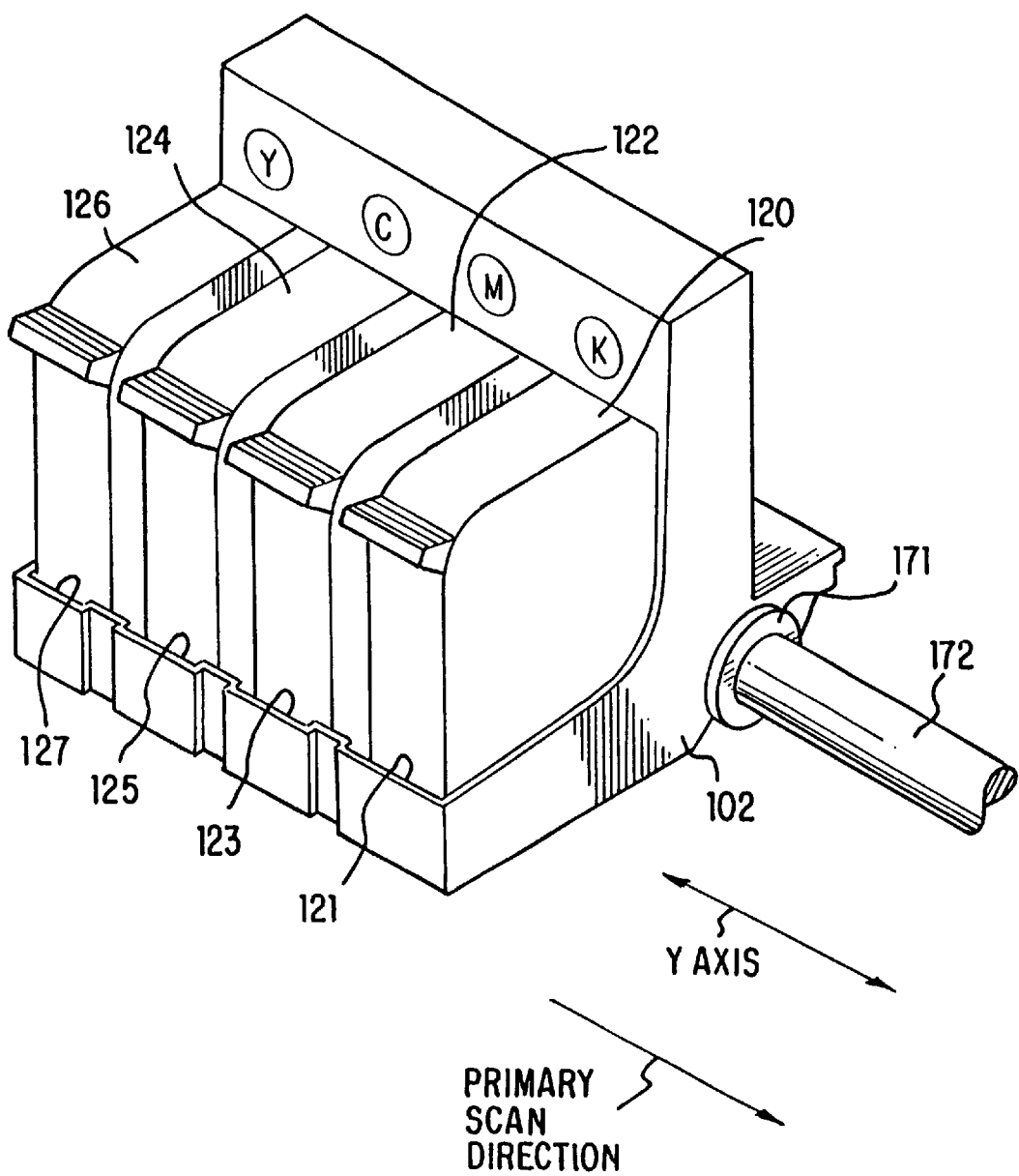
FIG. 2 shows a presently preferred embodiment of a print cartridge arrangement in a scanning carriage wherein four separate print cartridges for yellow, cyan, magenta and black ink can be utilized to generate higher resolution X/Y axis addressability from lower resolution printheads.
Figure 17:
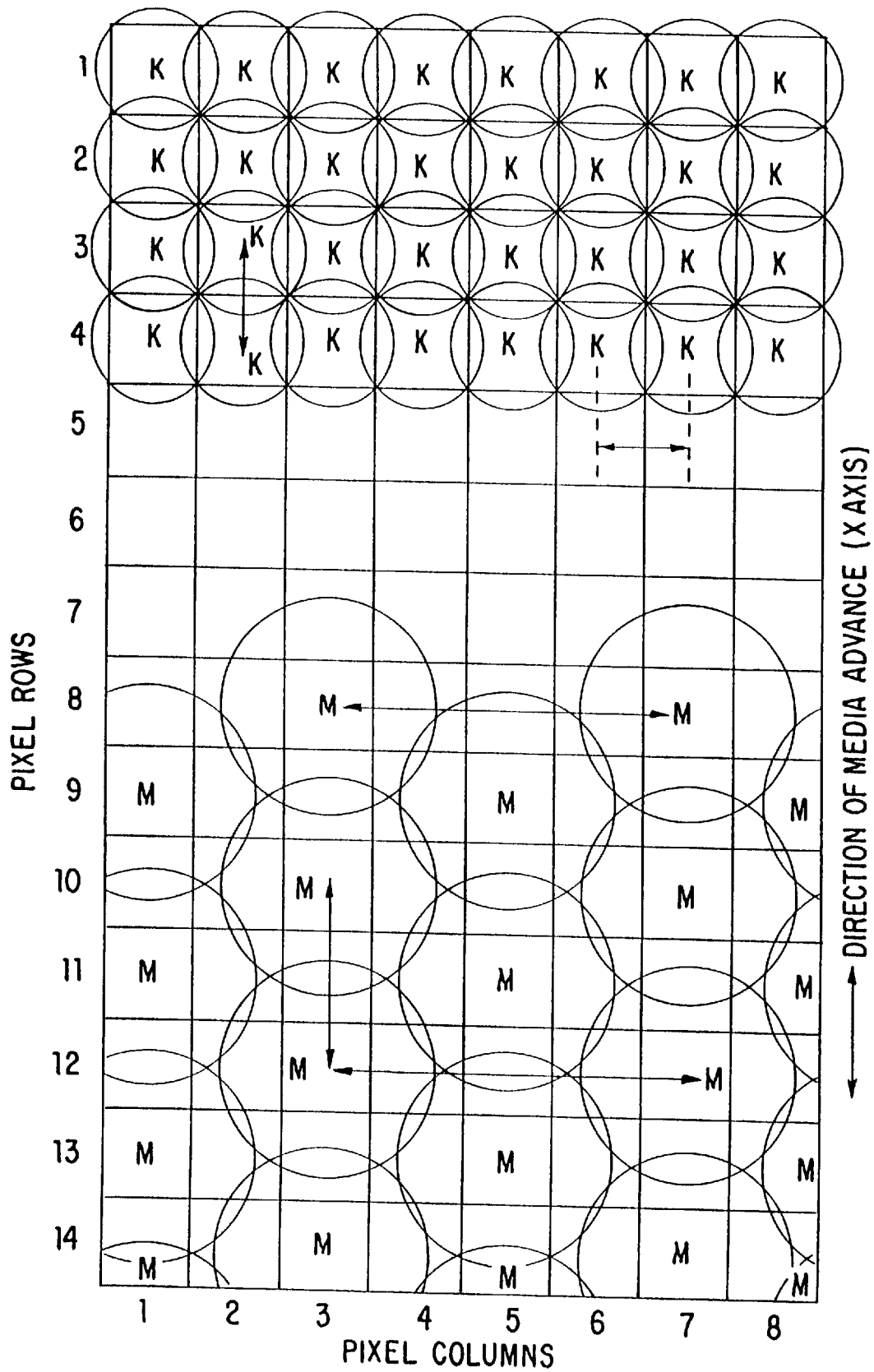
FIG. 17 is an enlarged schematic representation showing and area fill of magenta ink made with the print masks of FIG. 13 and 15 for 300 dpi drops on a 600×600 addressable grid, as compared to an area fill of black ink made with undepleted 600 dpi drops on the same 600×600 addressable grid.

Referring to FIG. 2, a carriage 102 is slidably mounted on support bar 172 through a bearing sleeve 171, and includes four slots 121, 123, 125, 127 for removably receiving four inkjet print cartridges. From right to left in the carriage slots are respectively mounted a black ink cartridge 120, a magenta ink cartridge 122, a cyan ink cartridge 124 and a yellow ink cartridge 126. Although the invention has been successfully demonstrated with four 300 dpi print cartridges of the type shown in FIG. 2 (see also FIG. 14), in a currently preferred embodiment the black ink cartridge has a 600 dpi nozzle resolution and therefore prints 600 dpi sized drops which require no depletion (see the area fill comparison in FIG. 17).

Figure 3:
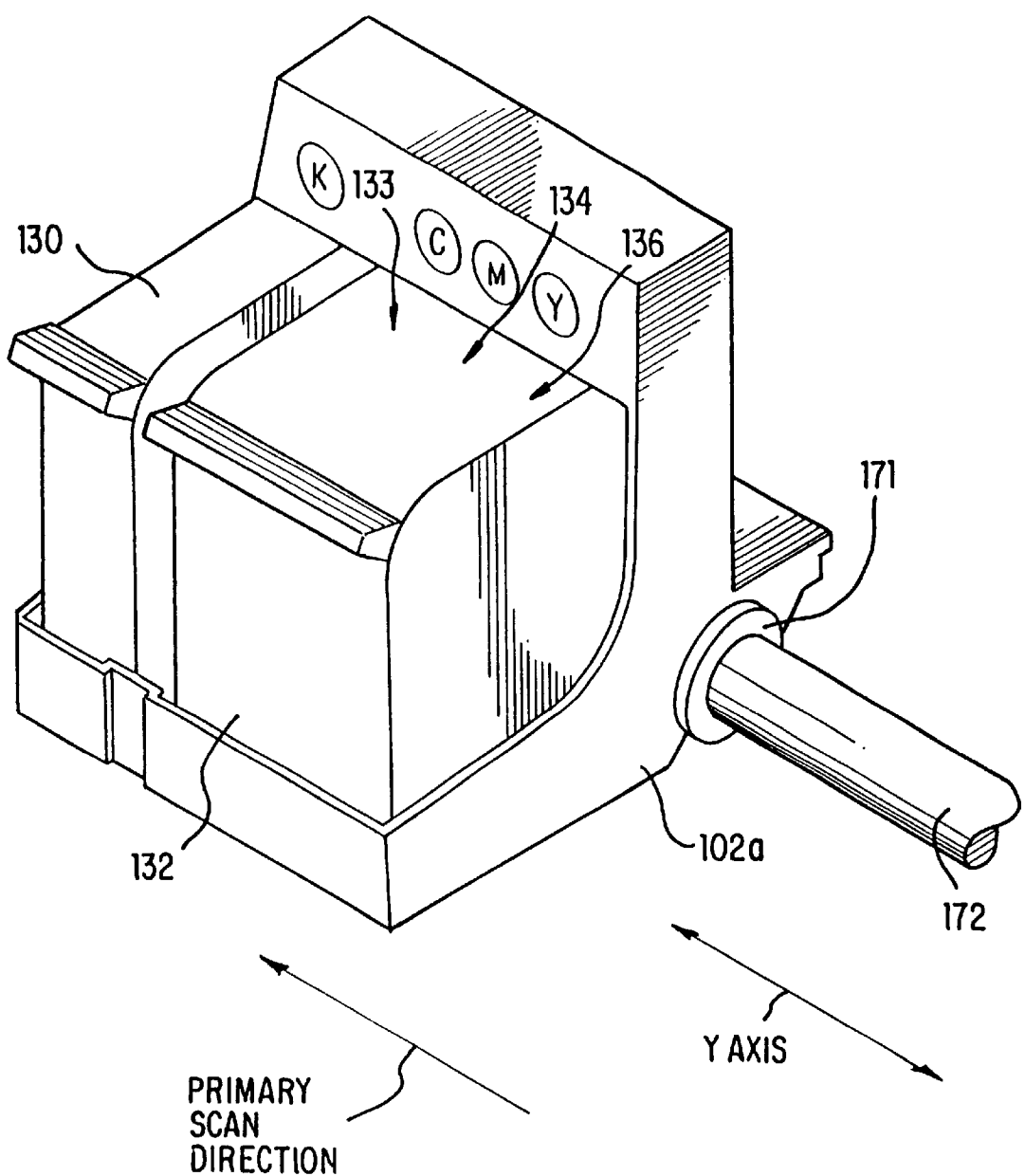
FIG. 3 shows another embodiment of a print cartridge arrangement in a scanning carriage where one separate print cartridge for black ink along with a tri-compartment print cartridge for cyan, magenta, and yellow ink can be utilized to generate the higher resolution addressability of the invention.

Referring to FIG. 3, a modified carriage 102a carries a removably mounted black ink cartridge 130, and a tri-compartment ink cartridge 132 which has separate ink reservoirs 133, 134, 136 for cyan, magenta and yellow ink, respectively.

Figure 4:
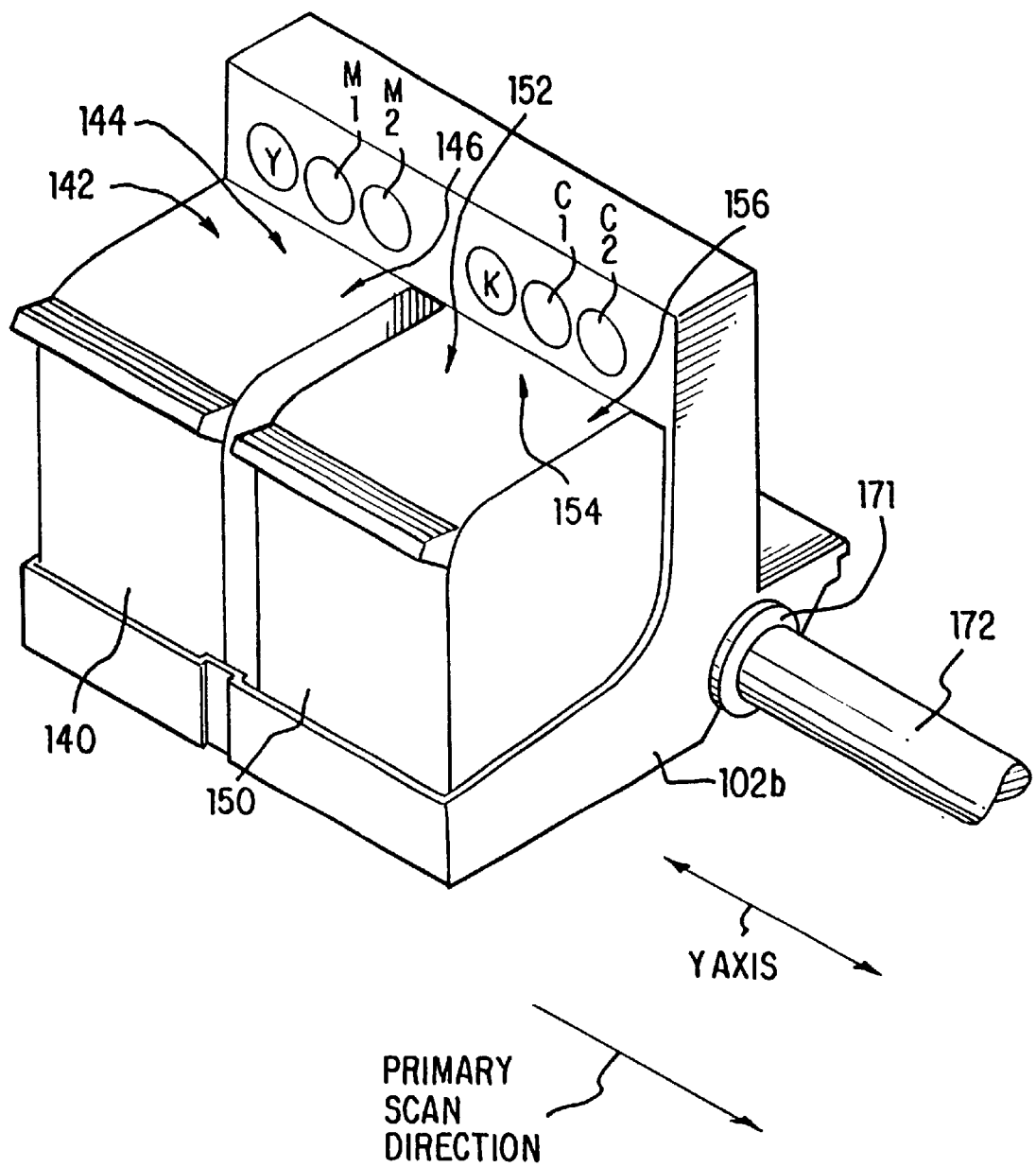
FIG. 4 shows an additional embodiment of a print cartridge arrangement in a scanning carriage where a first tri-compartment print cartridge for yellow, light magenta, and dark magenta ink along with a second tri-compartment print cartridge for black, light and dark cyan ink can be utilized to generate the higher resolution addressability of the invention.

Referring to FIG. 4, a further modified carriage 102b carries a first tri-compartment ink cartridge 140 which has separate ink reservoirs 142, 144, 146 for yellow, light magenta, and dark magenta ink, respectively. A second adjacent tri-compartment ink cartridge 150 has separate ink reservoirs 152, 154, 156 for black, light cyan, and dark cyan ink, respectively.

Figure 5:
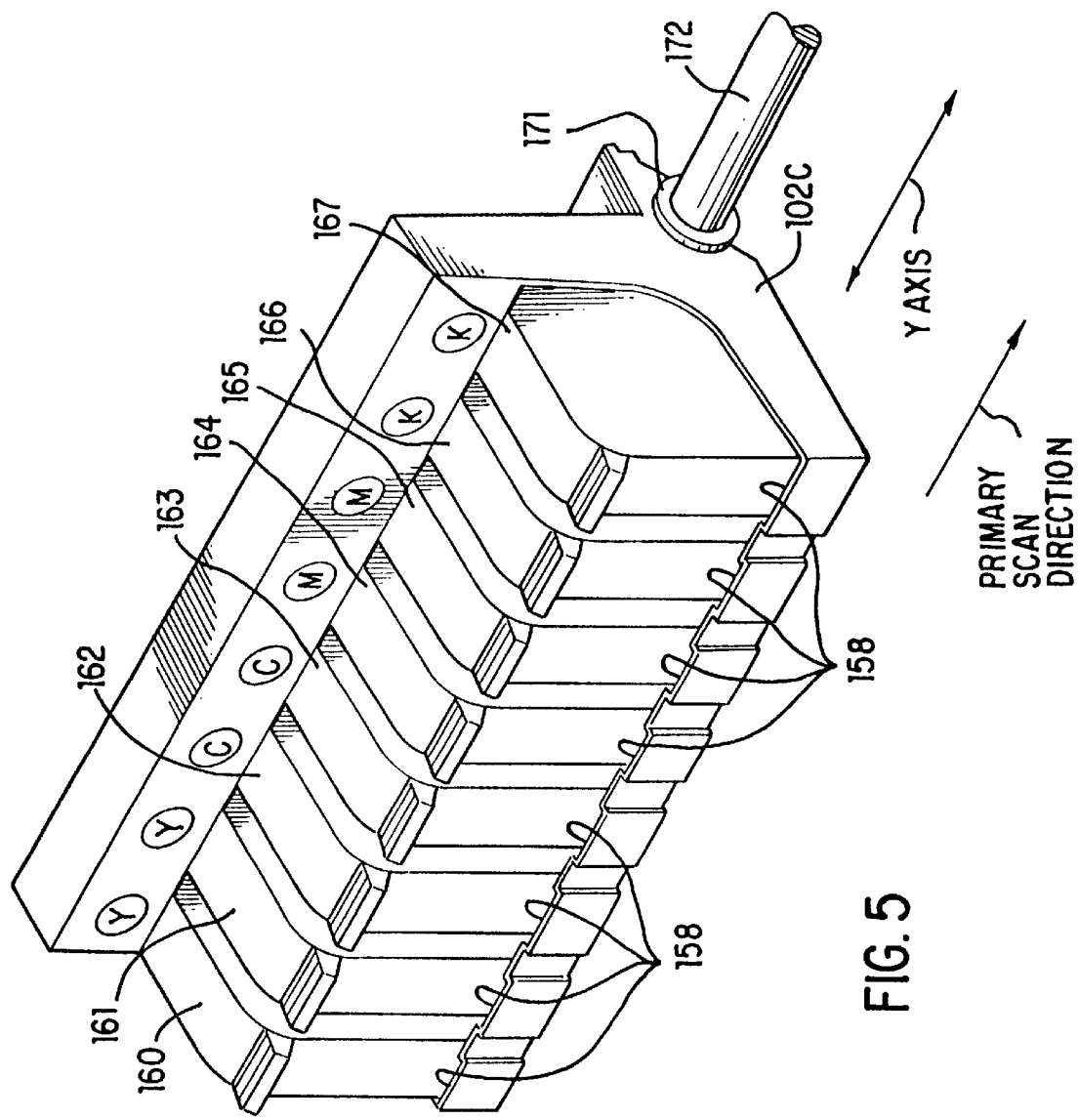
FIG. 5 shows an additional embodiment of a print cartridge arrangement in a scanning carriage where two separate print cartridges for each of yellow, cyan, magenta and black inks can be utilized to generate the higher resolution addressability of the invention.

Referring to FIG. 5, another modified carriage 102c has a plurality of individual mounting slots 158 for carrying two adjacent yellow ink cartridges 160, 161, two adjacent cyan ink cartridges 162, 163, two adjacent magenta ink cartridges 164, 165, and two adjacent black ink cartridges 166, 167.

Figure 6:
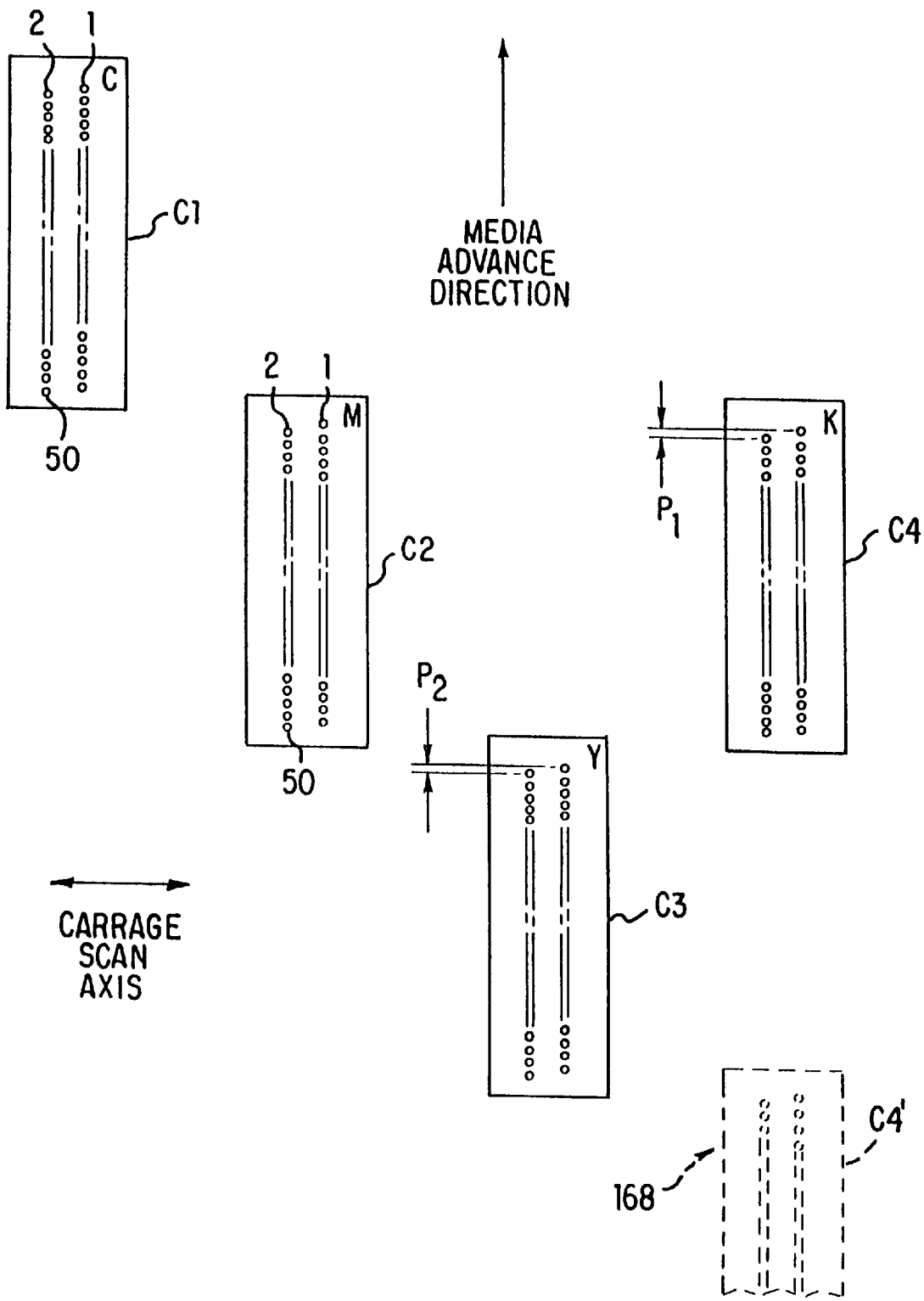
FIG. 6 shows a further embodiment of printhead arrangements in a scanning carriage wherein four separate cartridges for different ink colors which are staggered to provide non-overlapping swaths for each color can be utilized to generate the higher resolution addressability of the invention.

Referring to FIG. 6, a different arrangement of staggered color ink printheads C1, C2, C3 and C4 are shown for cyan, magenta, yellow and black ink, respectively. The cartridge C4 can be aligned with either the magenta or cyan cartridge, or can be separately positioned at position 168 to be non-overlapping with the other print cartridges. The nozzle resolution P1 can be the same as P2 as shown in the drawing (e.g. 300 dpi), or can be 600 dpi (not shown in this drawing).

Figure 8:
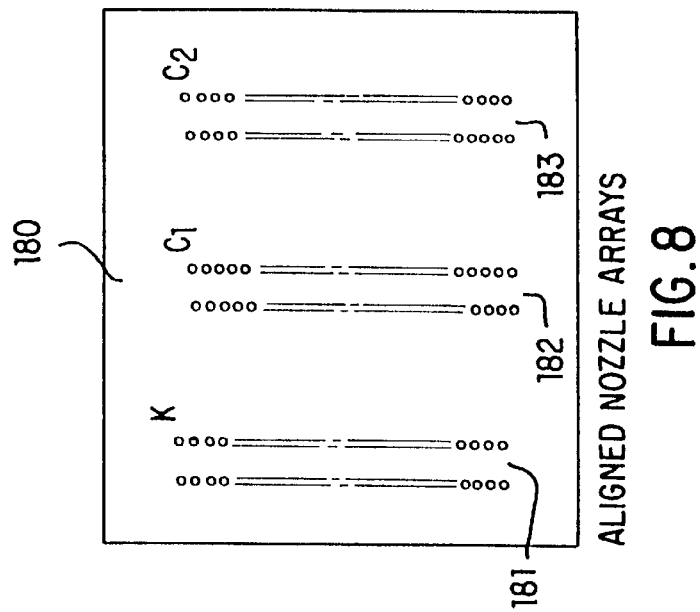
FIG. 8 shows still a further embodiment of a tri-compartment printhead wherein three separate nozzle arrays for different ink colors such as black, light cyan, and dark cyan which are aligned to provide overlapping swaths for each color can be utilized to generate the higher resolution addressability of the invention.
Figure 7:
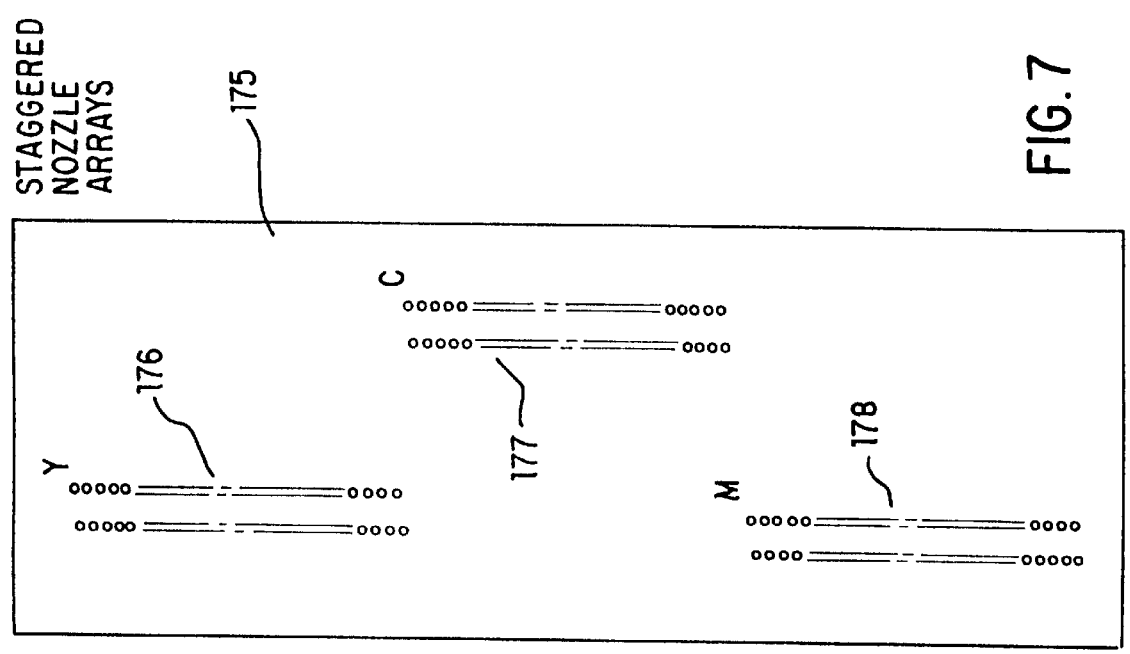
FIG. 7 shows yet another embodiment of a tri-compartment printhead wherein three separate nozzle arrays for different ink colors such as yellow, cyan, and magenta which are staggered to provide non-overlapping swaths for each color can be utilized to generate the higher resolution addressability of the invention.

The tri-compartment nozzle plate 175 in FIG. 7 shows three nozzle arrays 176, 177, 178 for yellow, cyan, and magenta ink, respectively, which are staggered in order to print separate swaths during a single pass. The tri-compartment nozzle plate 180 in FIG. 8 shows three nozzle arrays 181, 182, 183 for black, light cyan, and dark cyan ink, respectively.

Figure 9:
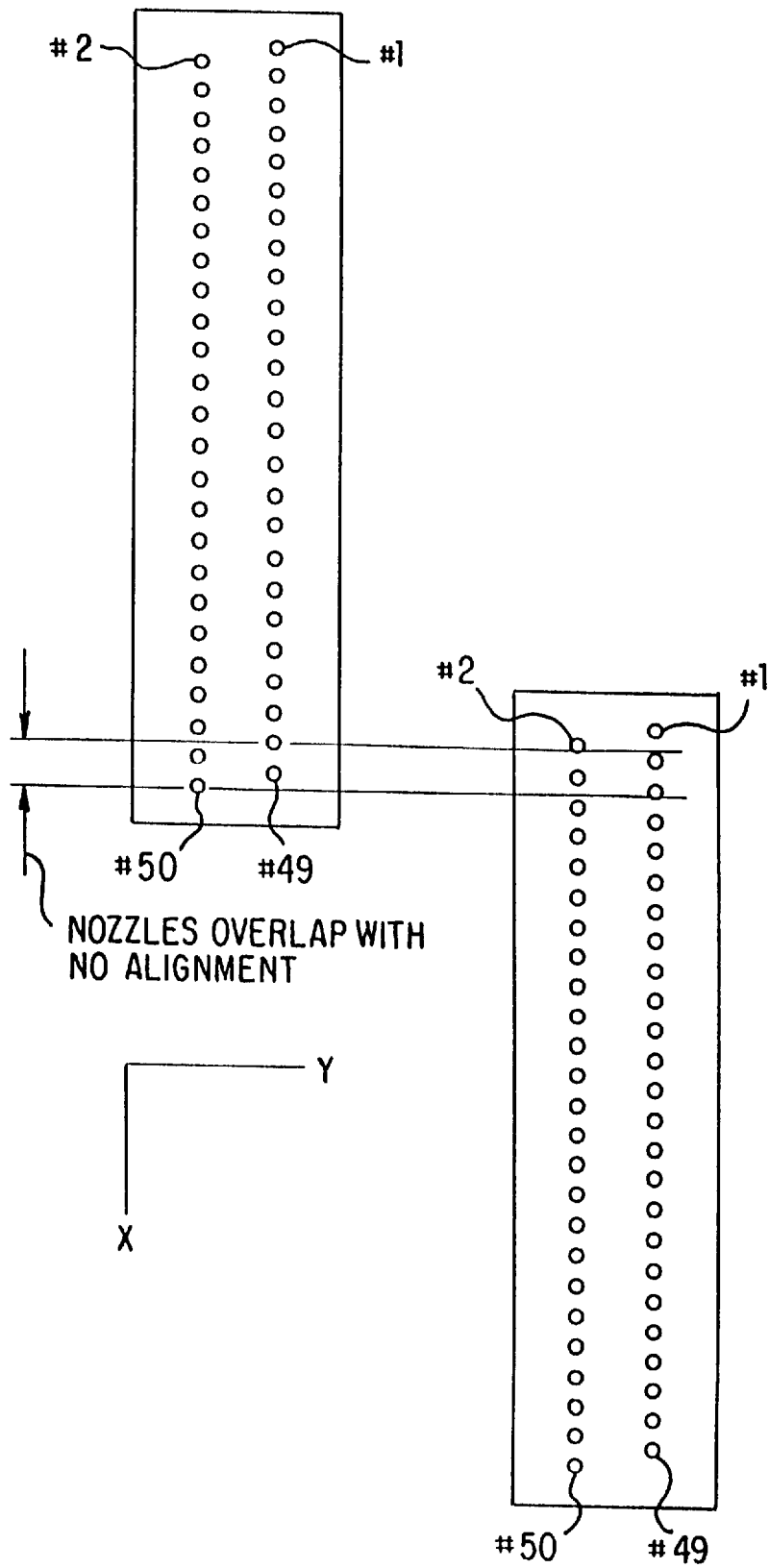
FIG. 9 shows a different embodiment of two separate printheads of a given nozzle resolution such as 300 dpi both having the same color of ink, and being relatively positioned on a scanning carriage to have a small nozzle overlap with no direct nozzle alignment in the direction of the axis.
Figure 10:
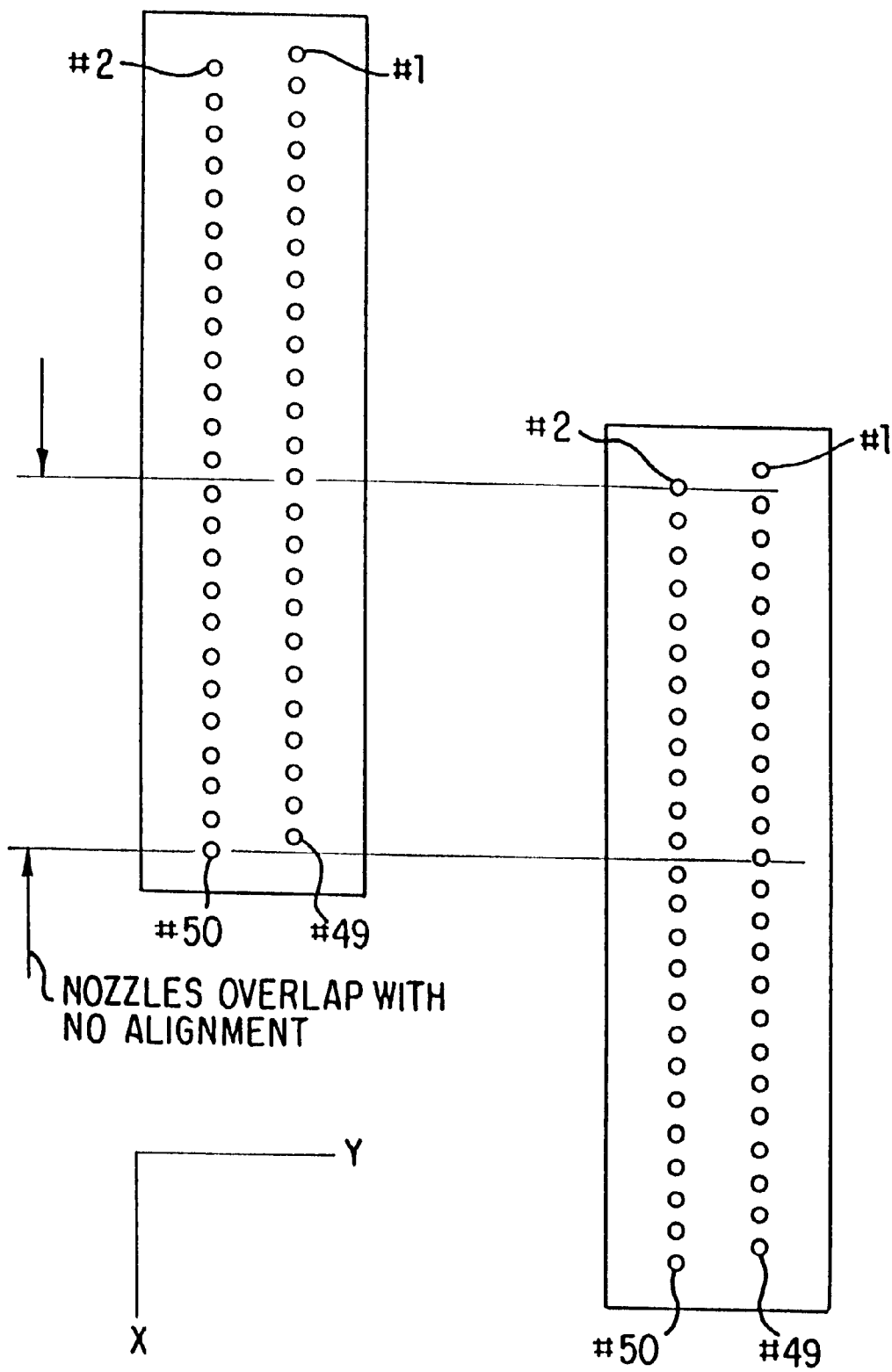
FIG. 10 shows the printheads of FIG. 9 being relatively positioned on a scanning carriage to have approximately 50% nozzle overlap.

FIGS. 9 and 10 show two identical 300 dpi printheads 185, 186 for the same color ink being positioned in different overlapping nozzle positions, but with no direct alignment in the Y axis direction between any nozzles in either printhead. This enables the possibility of printing on pixel rows which are 1/600th inch apart on a single carriage pass. The schematic of FIG. 11 shows the relationship between a nozzle pitch 188 of the 300 dpi for adjacent nozzles on the same printhead, as compared to a nozzle pitch 189 of 600 dpi for adjacent nozzles on different printheads.

Figure 11:
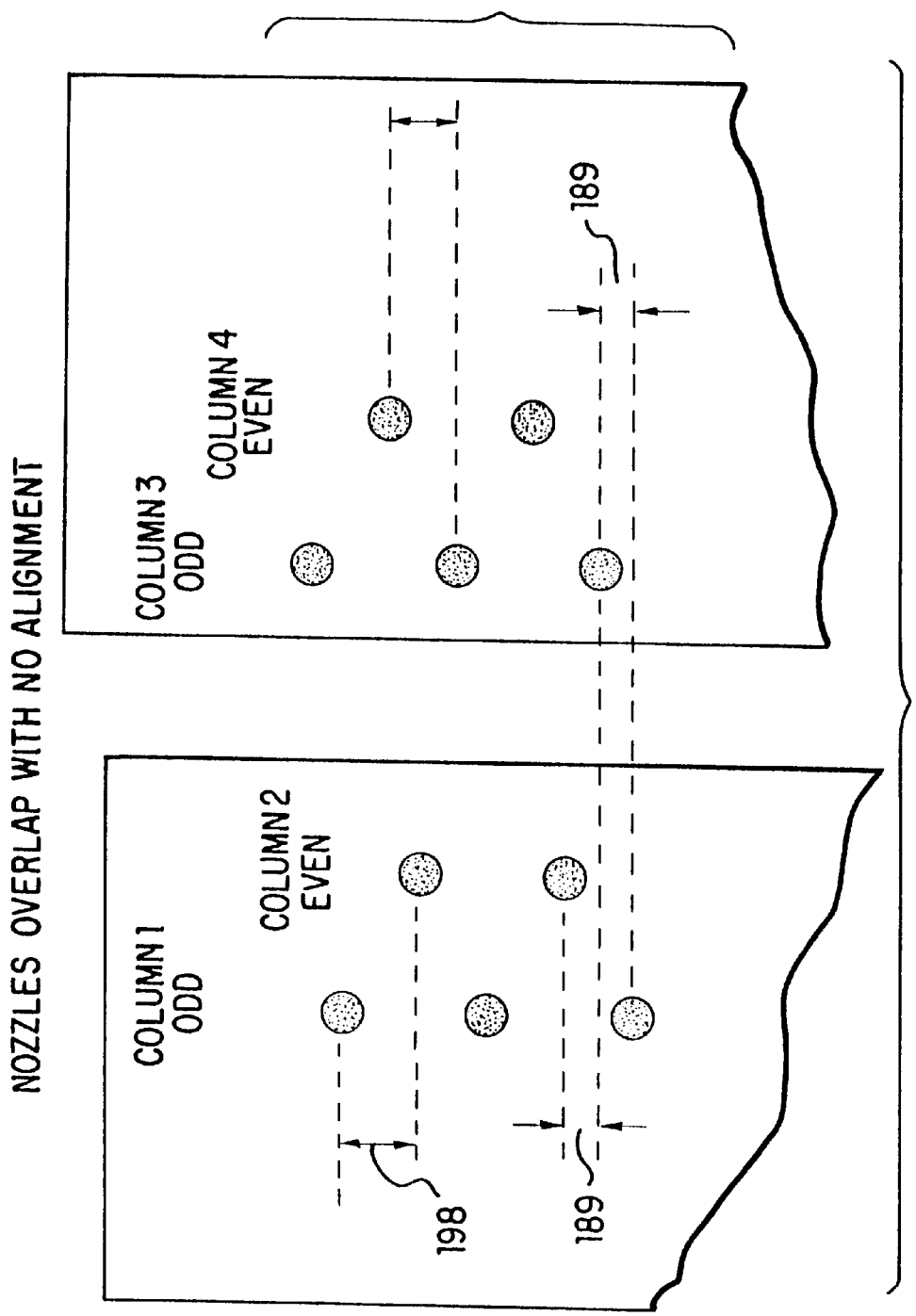
FIG. 11 shows the printheads of FIG. 9 being relatively positioned on a scanning carriage to have almost 100% nozzle overlap.
Figure 13:
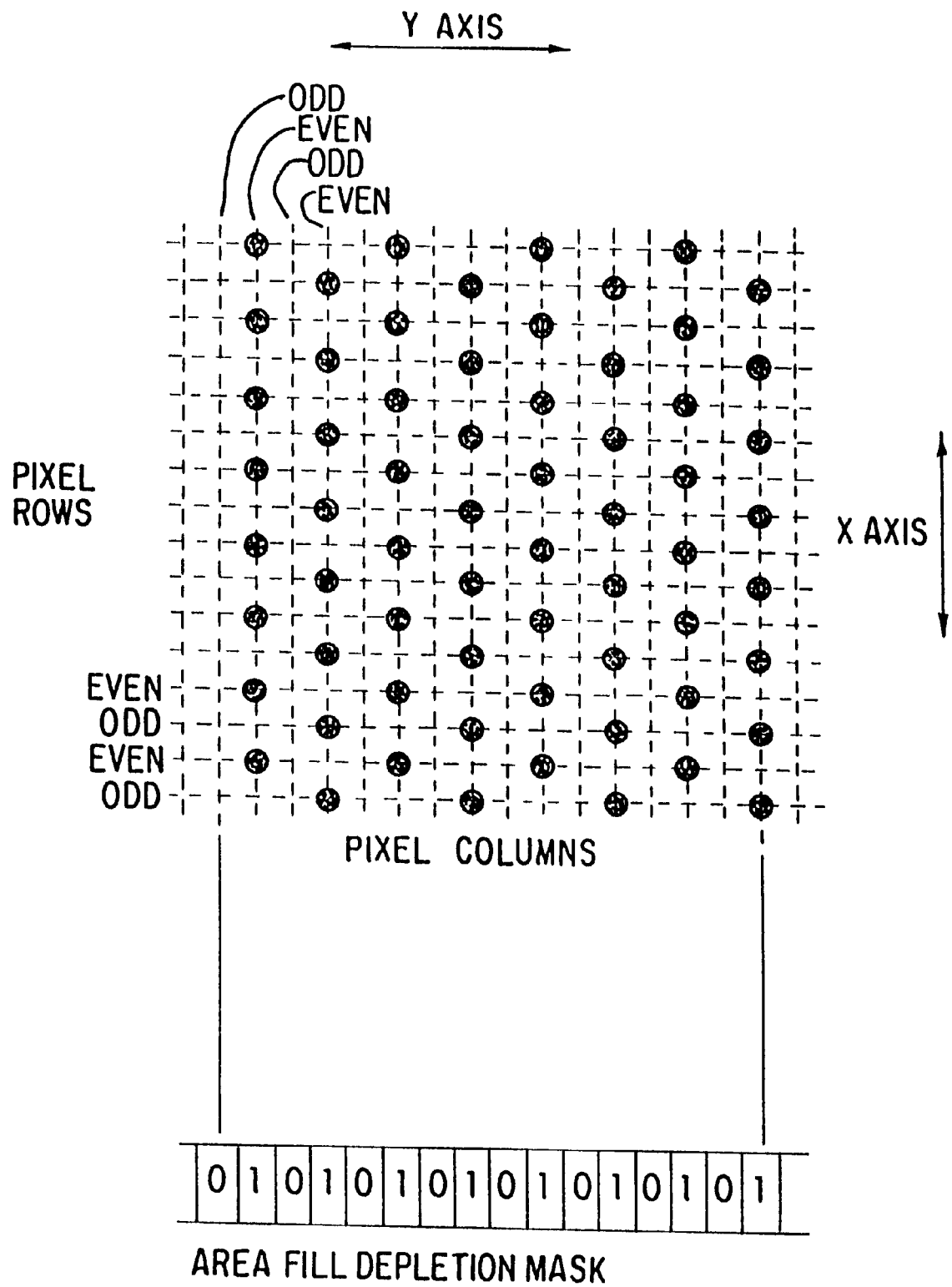
FIG. 13 shows an area fill depletion mask of the present invention which can be used when oversized color ink drops are applied to an increased resolution addressable grid.
Figure 14:
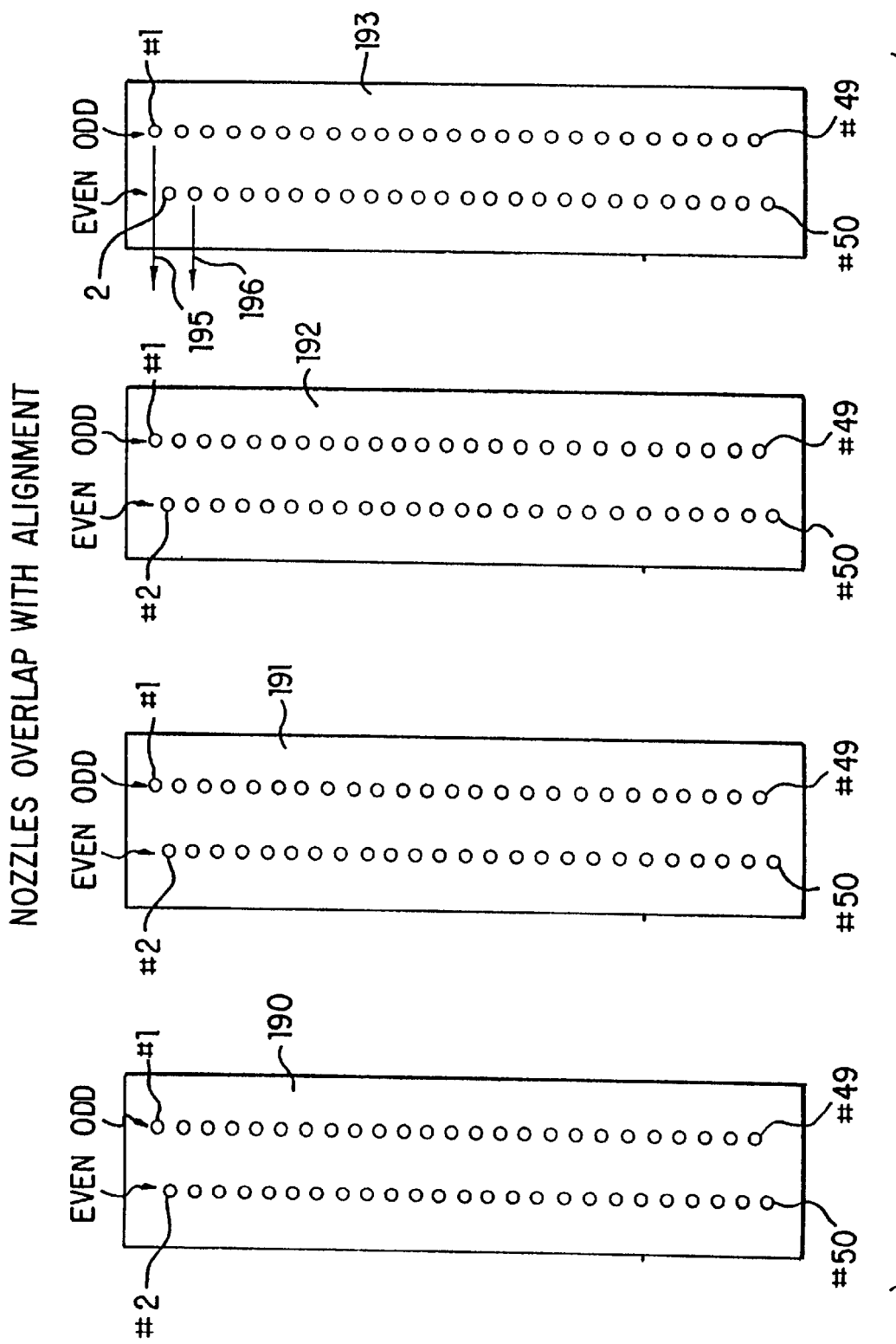
FIG. 14 is a schematic drawing showing four virtually identical 300 dpi nozzle arrays as used in the print cartridge arrangement of FIG. 2.

The non-aligned nozzles of FIGS. 9, 10 and 11 are contrasted with the aligned nozzles of the four identical 300 dpi printheads 190, 191, 192, 193 of FIG. 14. By printing with only 48 of the 50 nozzles, the remaining nozzles at one end or the other of the printhead can be turned "off" in order to facilitat the best possible alignment (see arrows 195, 196). The printhead arrangement of FIG. 14 has been implemented in combination with the area fill depletion mask 197 in FIG. 13 in order to print the depleted area fill of magenta drops schematically shown in FIG. 17.

Figure 12:
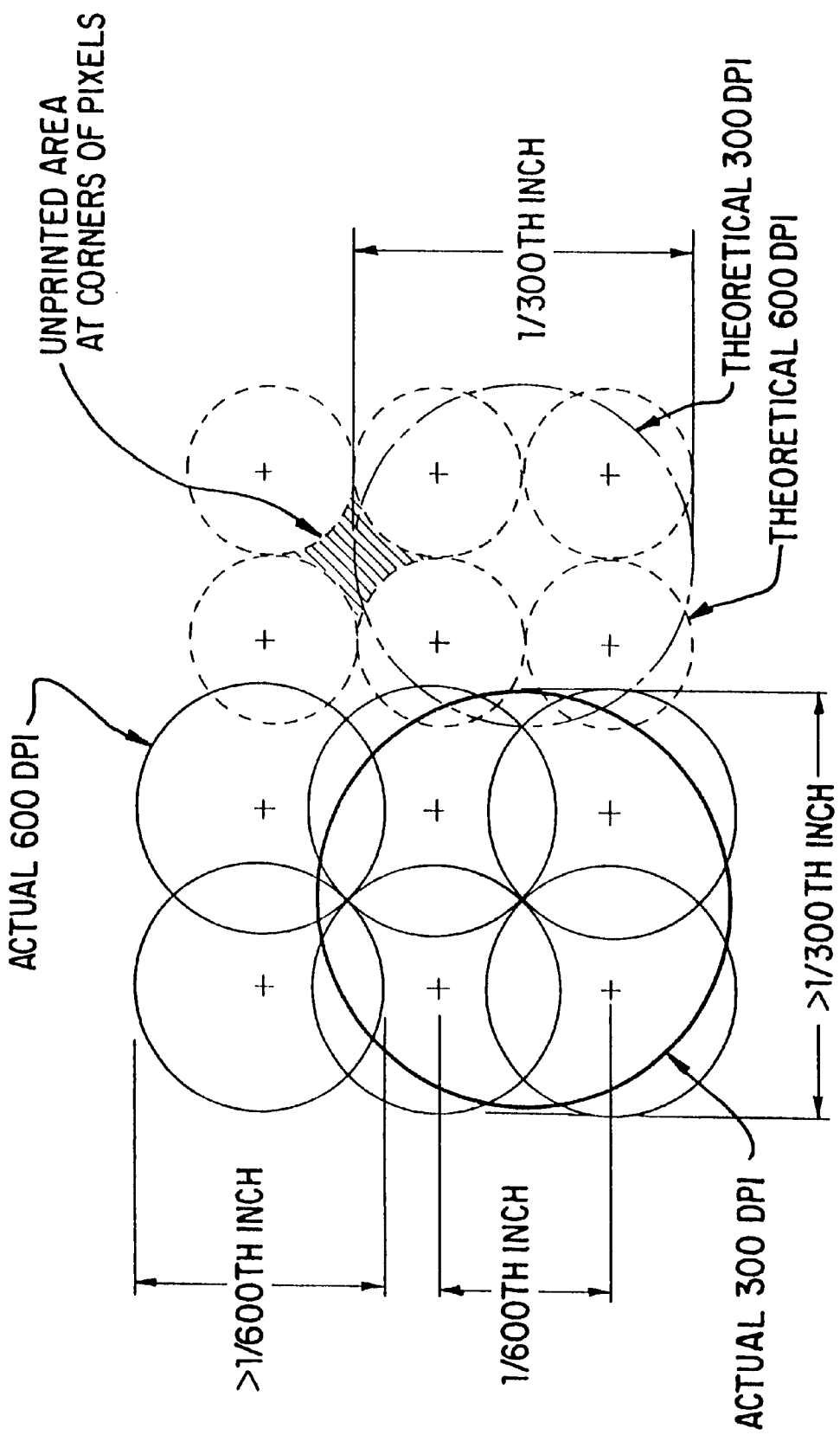
FIG. 12 is a schematic drawing showing a comparison between the theoretical drop size and the actual drop size for typical 300 dpi and 600 dpi ink drops.

The schematic drawing of FIG. 12 shows the size difference between theoretical and actual ink drops for a 300×300 dpi grid, as well as for a 600×600 dpi grid. The problem of too much ink is especially magnified when printing 300 dpi size ink drops on a 600×600 dpi grid. For this reason, it is very desirable to develop an improved depletion mask. Prior monochrome depletion techniques often provided inconsistent results because they were based in part on the external shape of a figure to be printed. In contrast, the present invention provides a plot independent mask as shown in FIG. 13. This is the basic grid which is preferably used for area fills, and it extends over the entire plot area to provide unique synchronized depletion. There is no drop overlap and this depletion mask has pixels "on" in every row. Both even and odd rows have 25% of the original amount of ink prior to depletion, so that interleaving print mods will work in a perfectly balanced way. Moreover, this depletion mask follows the periodic "on/off" firing mask 197 which enables the printheads to maintain the same firing frequency (approximately 5.5 KHertz) while at the same time maintaining the same scanning speed for the carriage (approximately 18.33 inches/sec.).

Figures 15, 16:
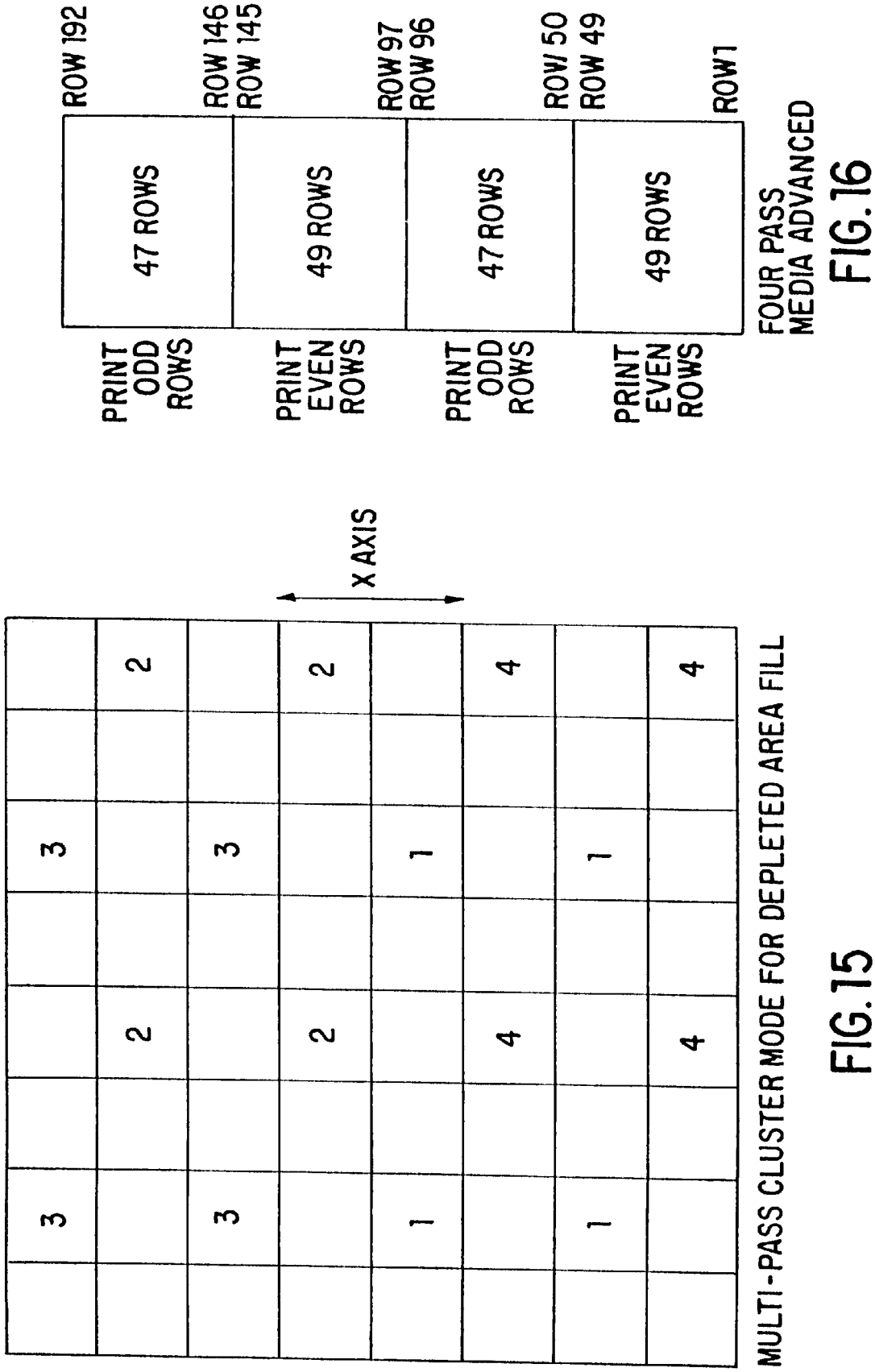
FIG. 15 shows a presently preferred embodiment of a multipass print mask of the present invention as used with the area fill depletion mask of FIG. 13.
FIG. 16 is a schematic drawing showing the amount of media advance for a four-pass increased resolution addressable print mode for the present invention.

In that regard, the four-pass cluster mode shown in FIG. 15 increases print quality and provides improved optical density. It is related to the media advance shown in FIG. 16 wherein the printheads alternate between printing on even and odd numbered rows (49 rows, 47 rows, etc.).

It will be understood that the various arrangements and embodiments of color printheads shown in the drawings can all be used to achieve the benefits of the increased 600×600 addressable print modes of the present invention, all without the need for an excessive number of nozzle passes over the same printing area on the media.

It will further be understood that the synchronized depletion mask assures balanced and predictable ink depletion, independent of the shape or color configuration of the figure(s) to be printed, thereby improving color print quality.

Figure 18:
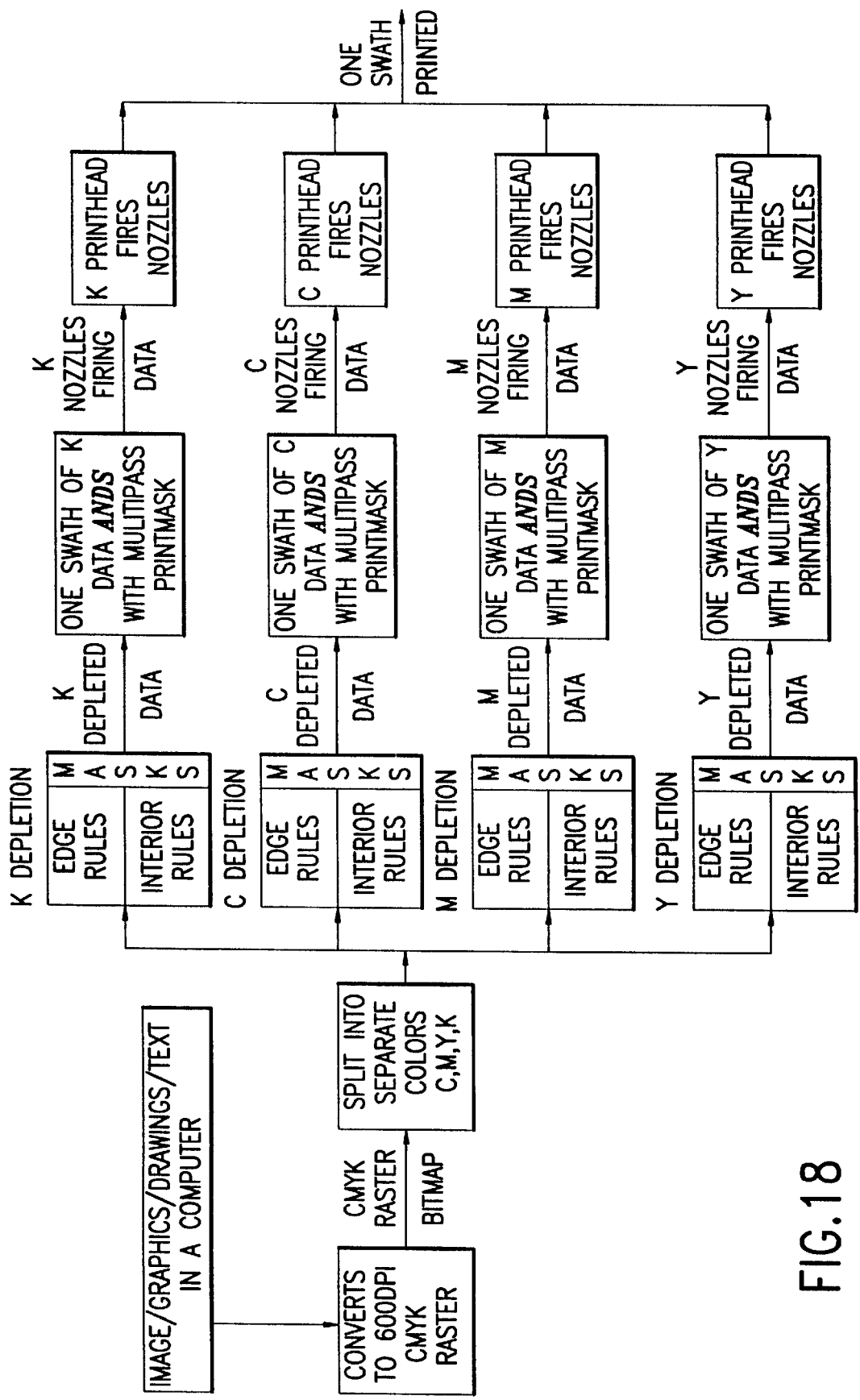
FIGS. 18–19 are self explanatory flow charts showing the depletion techniques of the invention.
Figure 19:
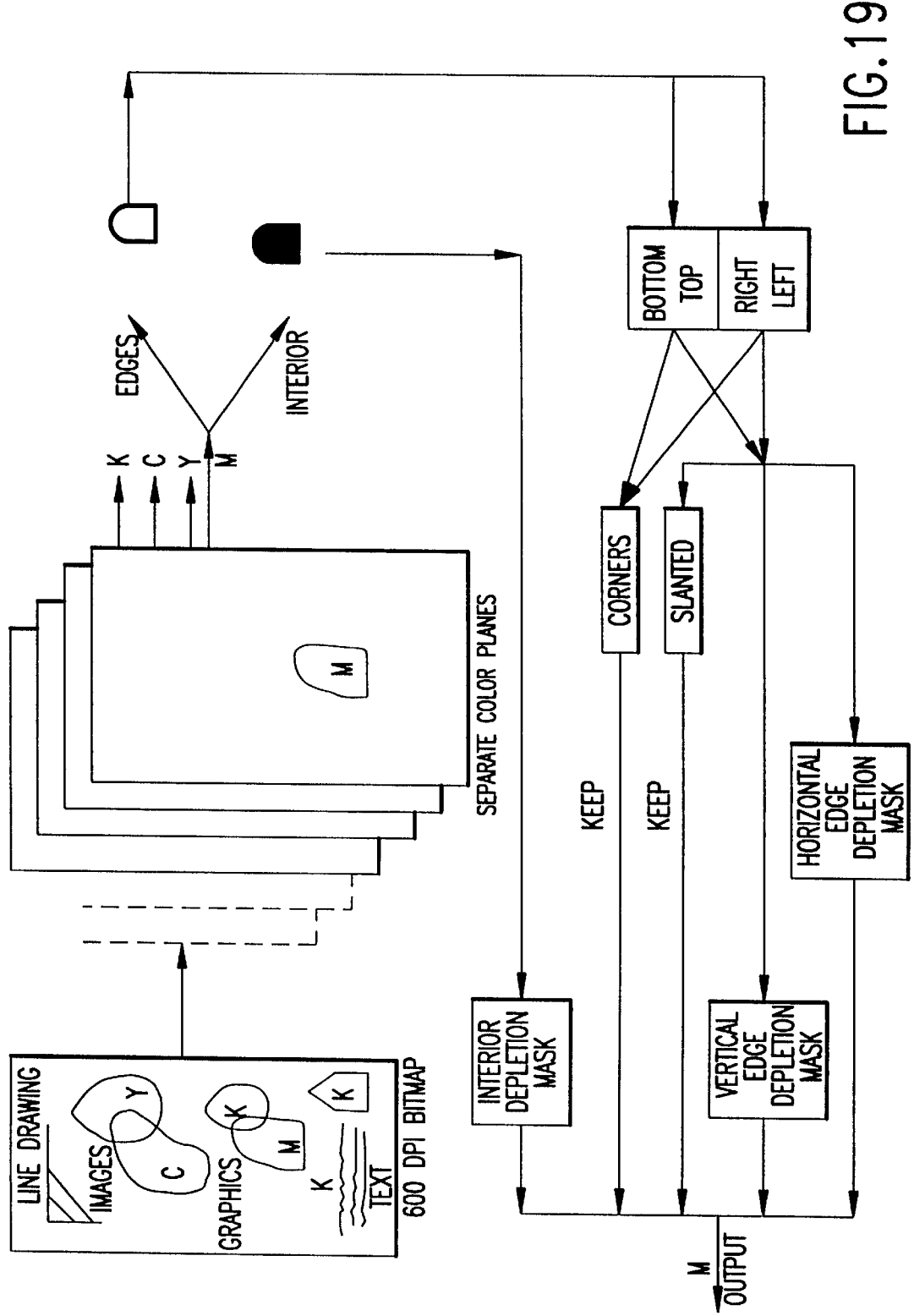

FIGS. 18–19 show the separation of figures into separate color planes before depletion, and also show the separate depletion techniques applied to area fills as compared to edge enhancement.

Figure 20:
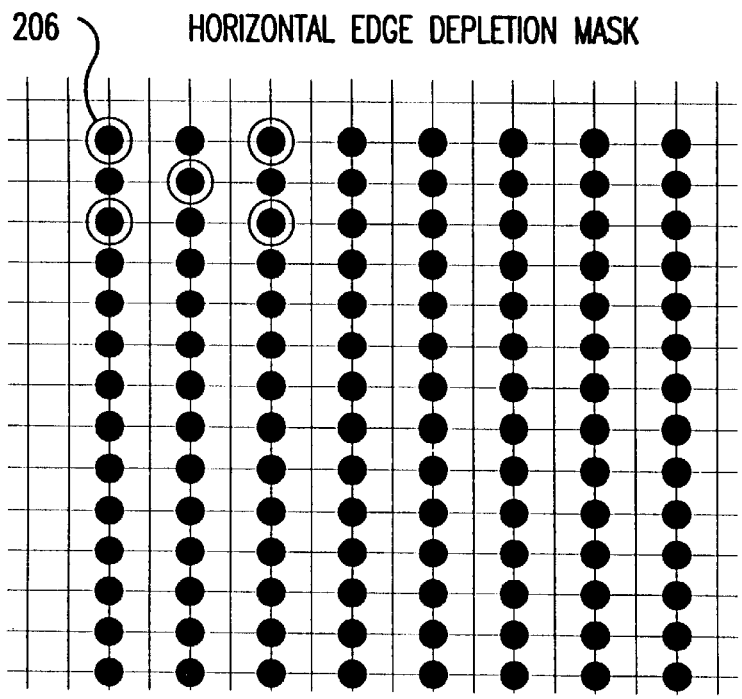
FIGS. 20 and 21 show the depletion masks for horizontal and vertical edges, respectively.
Figure 21:
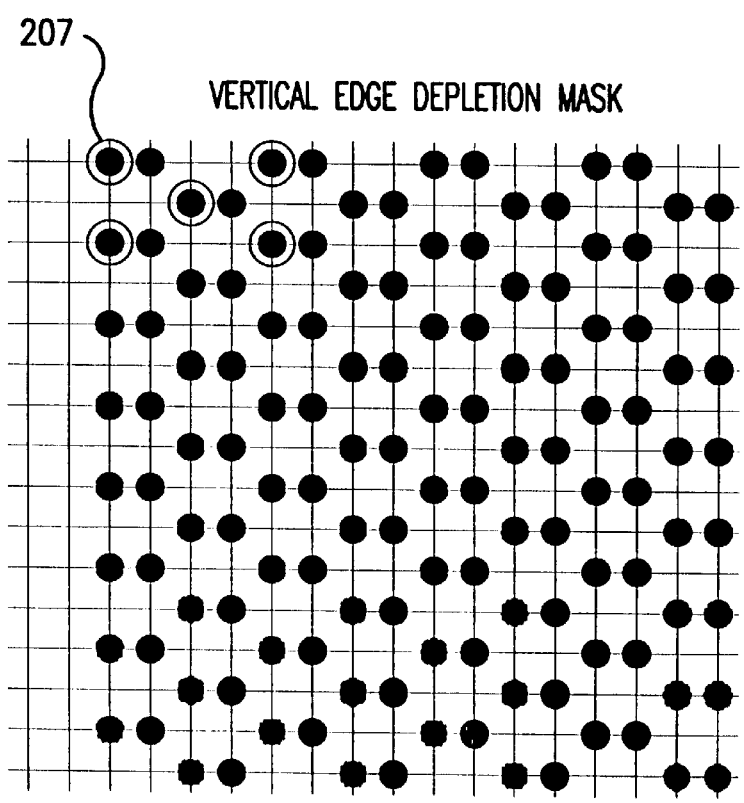

The horizontal edge depletion mask of FIG. 20 shows the locations 206 for the area fill "on" pixels, and the vertical edge depletion mask of FIG. 21 also shows such locations 207.

Figure 22:
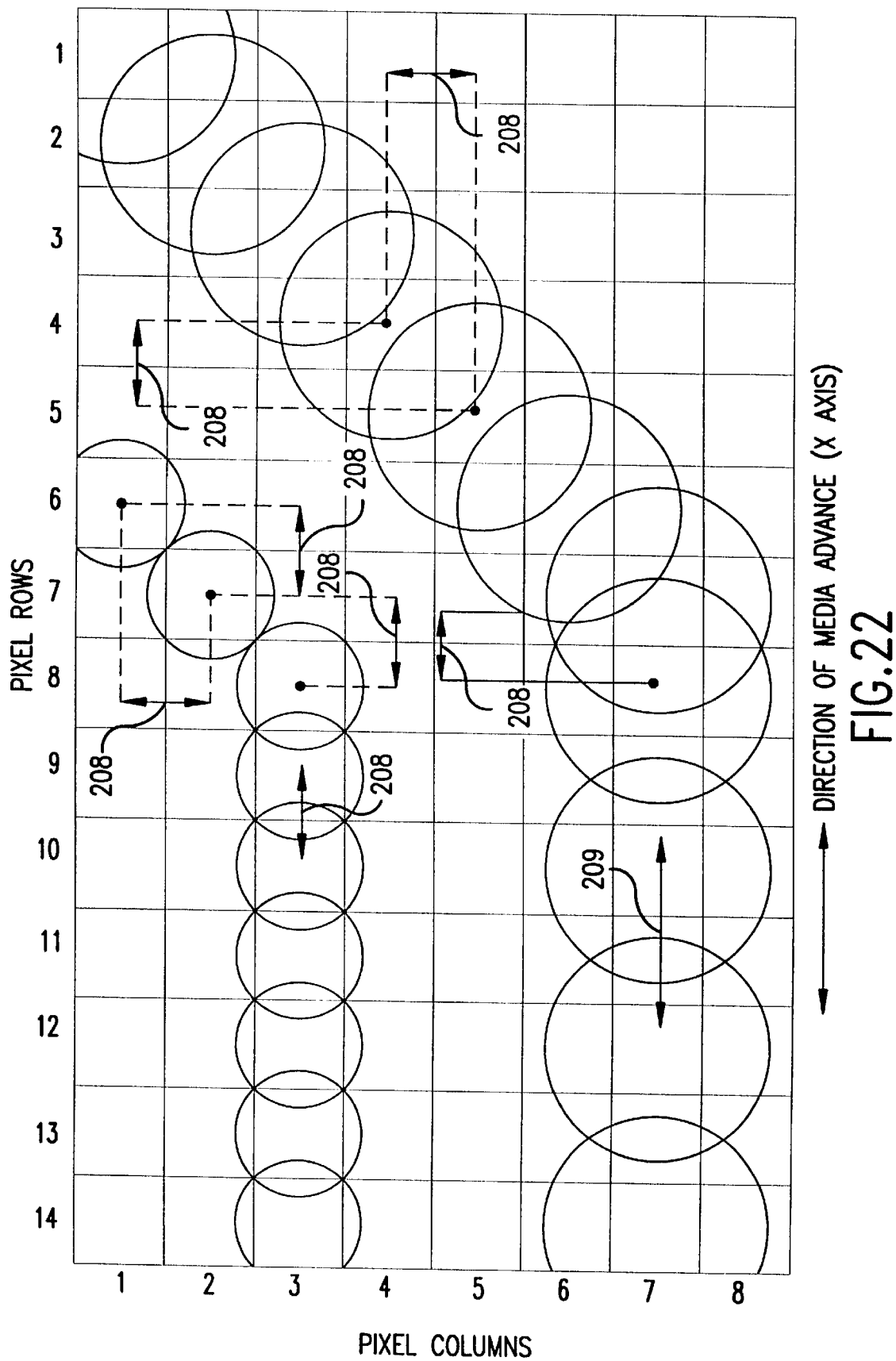
FIG. 22 is a comparison of lines made with 600 dpi size non-depleted drops and 300 dpi size depleted drops on a 600×600 dpi grid.

The non-depleted pixel separations in FIG. 22 are shown at 208, while a depleted pixel separation is shown at 209.

Figure 23:
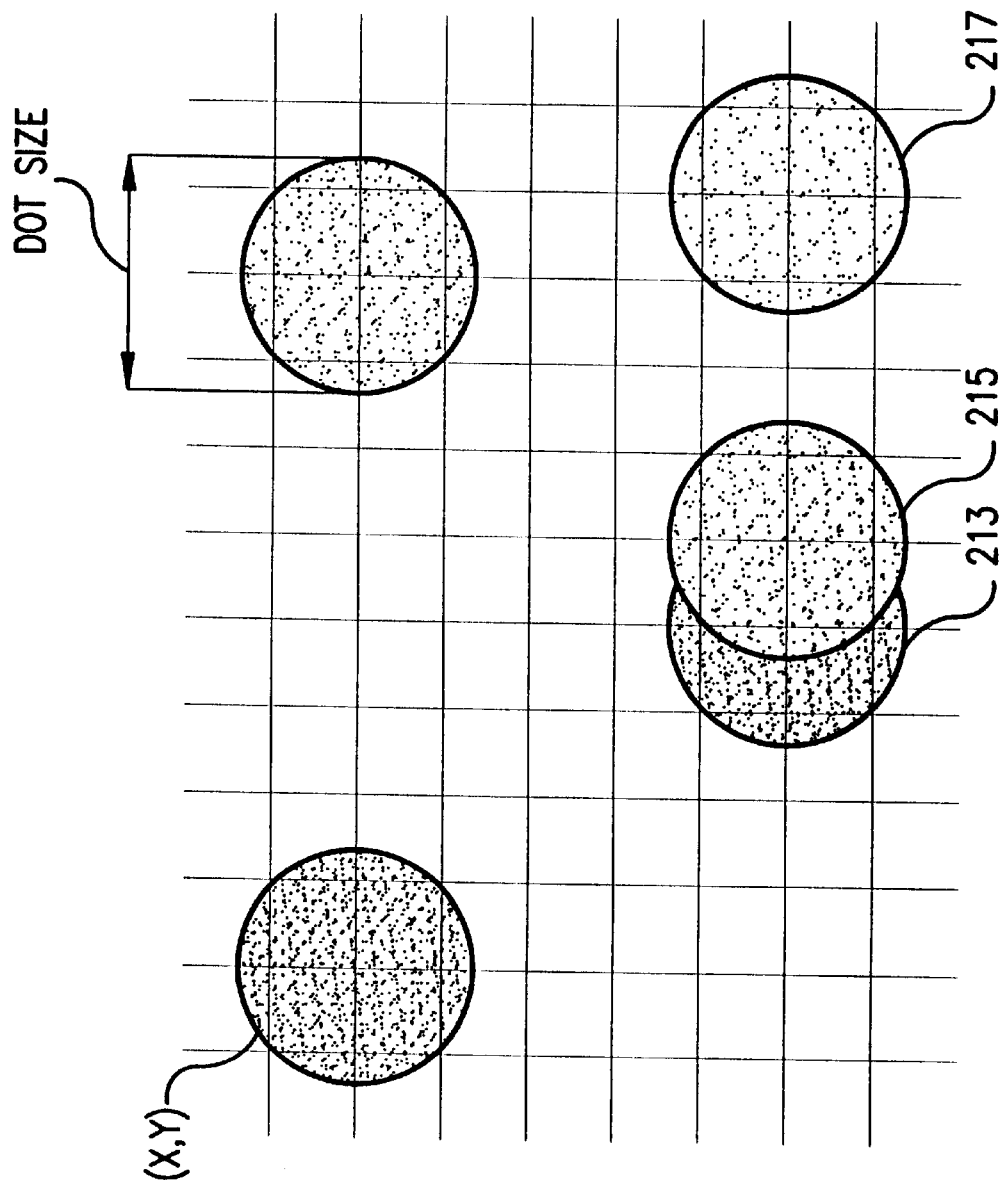
FIG. 23 shows the 300 dpi dot size on a 600×600 dpi grid.
Figure 24:
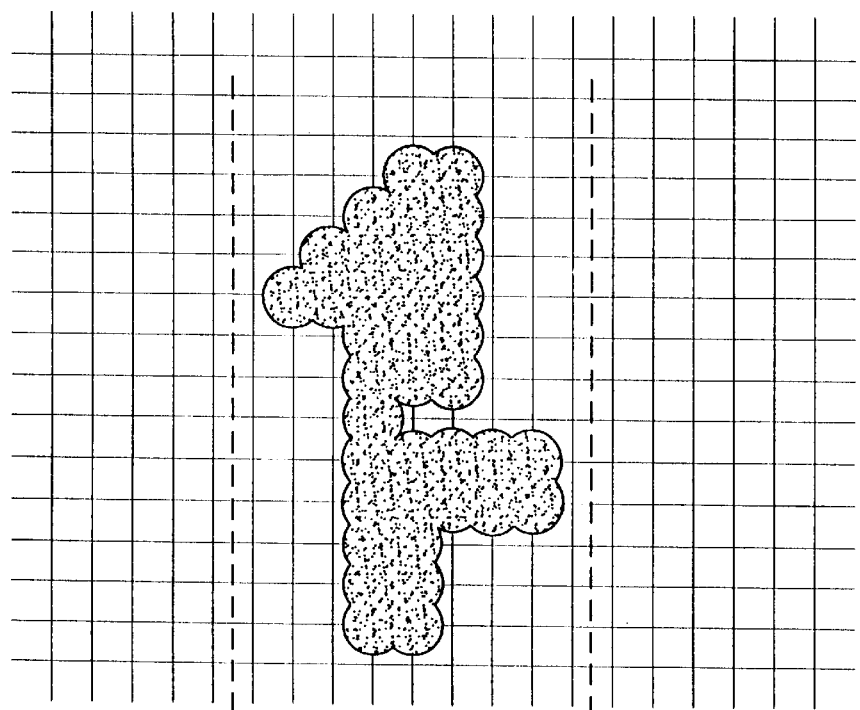
FIG. 24–29 are self-explanatory schematic representations of the various steps of the depletion techniques of the invention.
Figure 25:
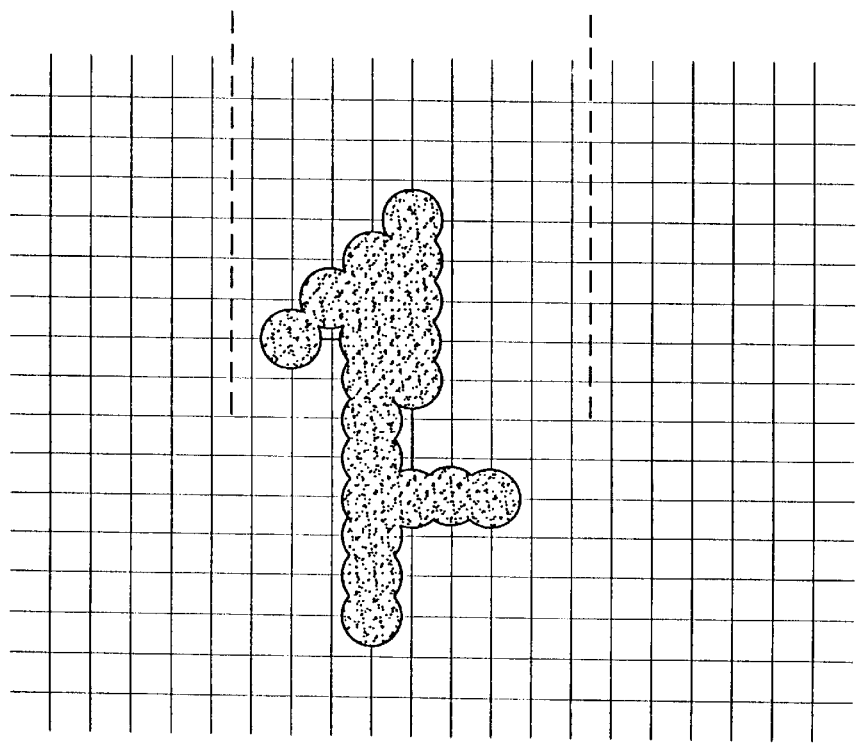
Figure 26:
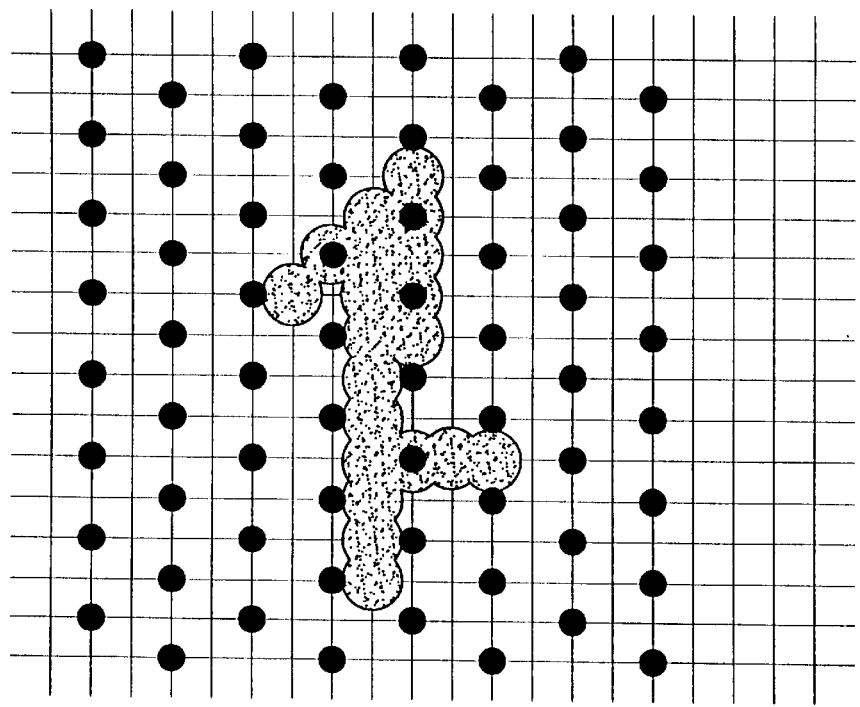
Figure 27:
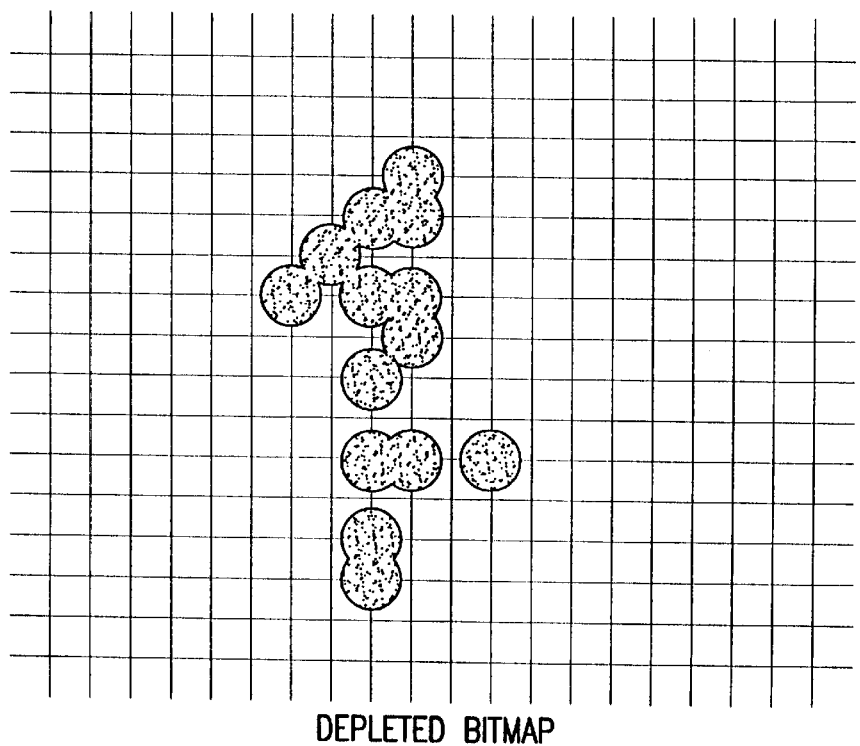
Figure 28:
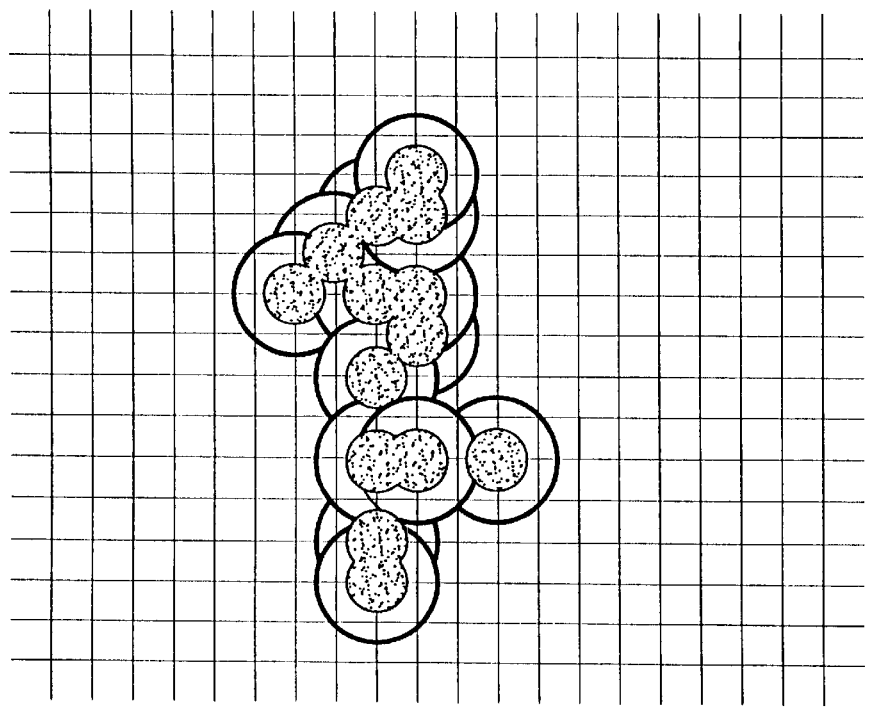
Figure 29:
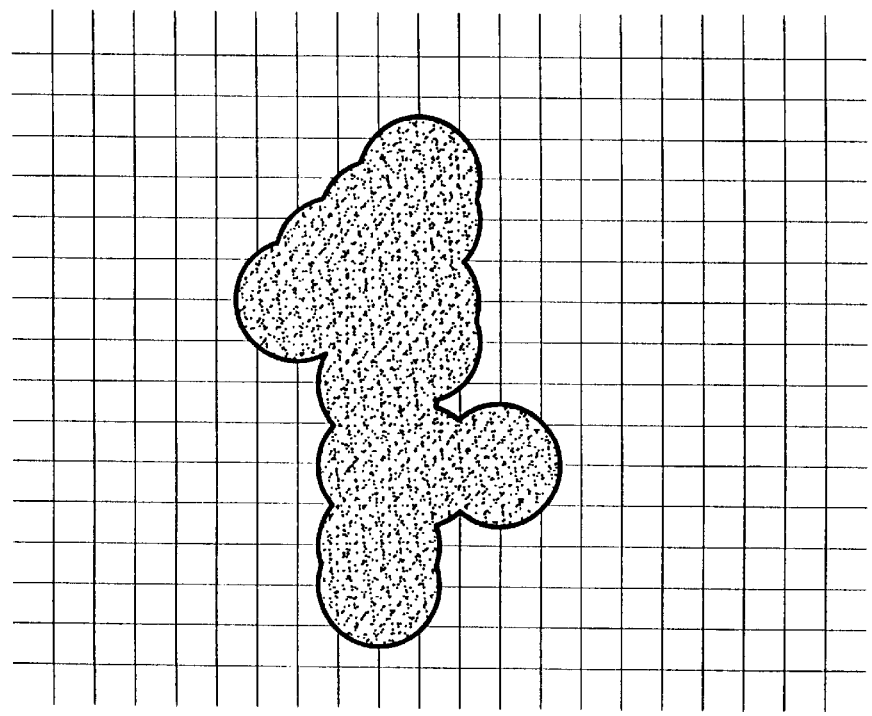

Dot next to dot secondary colors 213, 215 as well as dot on dot secondary colors 217 are shown in FIG. 23, on a 600×600 dpi grid, both present problems of excessive ink.

The illustrative drawings of FIGS. 24–29 show what happens when all the depletion rules and masks are applied to a figure, and the flow chart of FIG. 30 is a self-explanatory sequential step by step visual explanation thereof.

Figure 31:
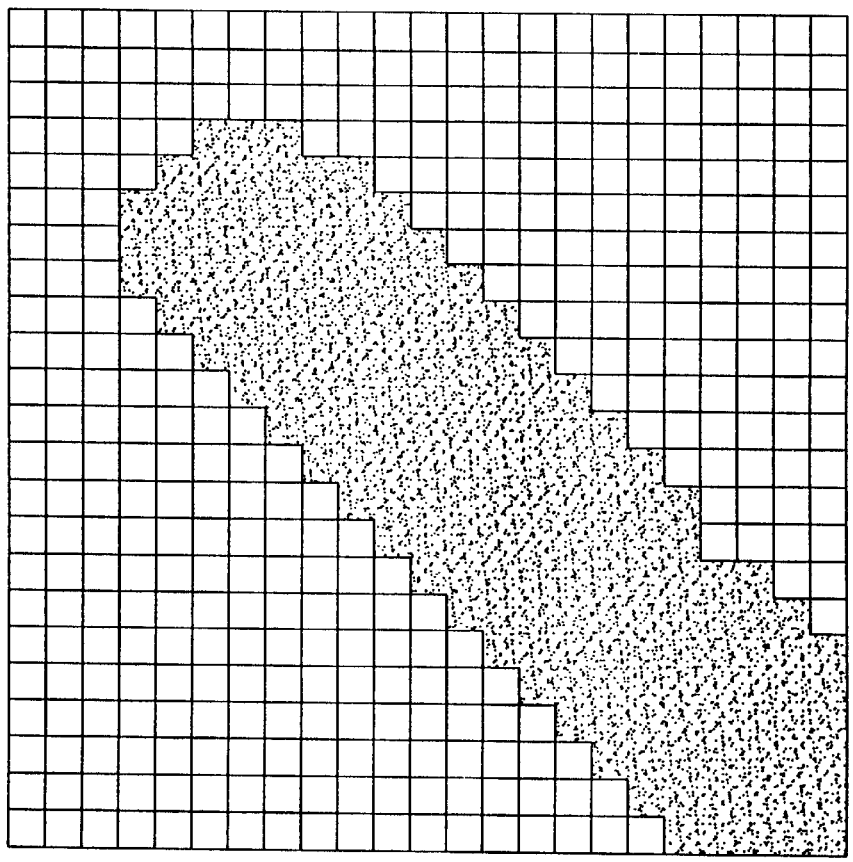
FIGS. 31 and 32 show a thickened line on a 600×600 dpi grid before and after depletion, respectively.
Figure 32:
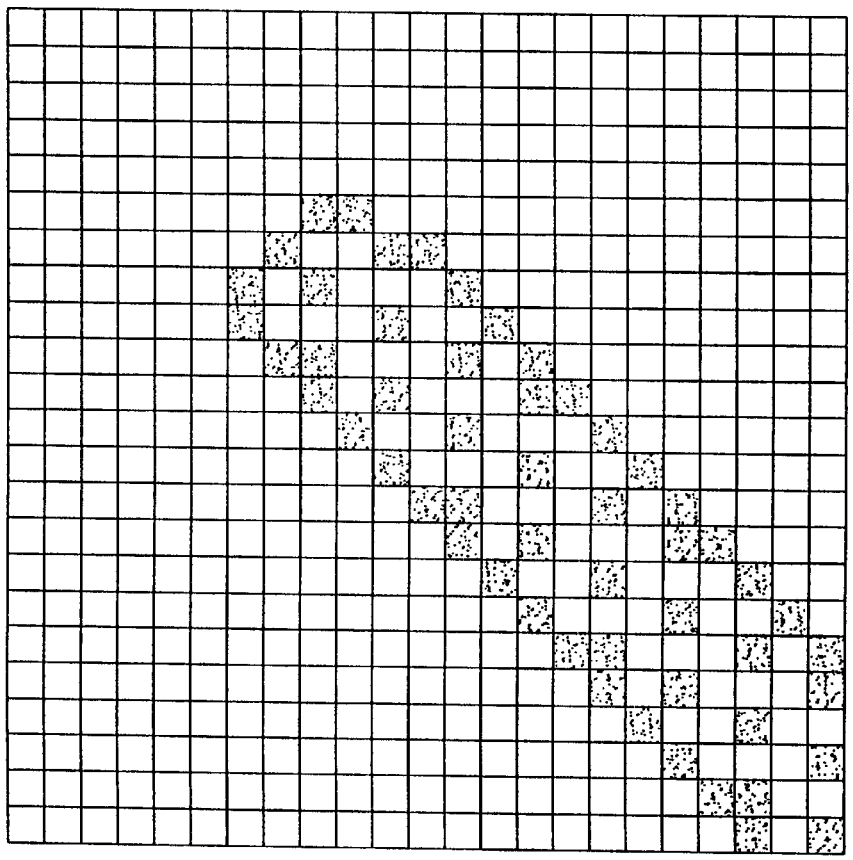

Finally, the drawings of FIGS. 31 and 32 show how the depletion techniques are applied to a thickened line.

While exemplary and preferred embodiments of the invention have been shown and described, it will be appreciated by those skilled in the art that various modification and revisions can be made without departing from the spirit and scope of the invention as set forth in the following claims.

I claim as my invention:

1. A swath printing system where a scanning carriage carries printheads with nozzles along a carriage scan axis called a Y axis over media which is periodically advanced through a print zone in a media advance direction called an X axis to print on a pixel grid of horizontal rows extending in a Y axis direction and vertical columns extending in an X axis direction, comprising:

a plurality of printheads, each having a different ink color for application of different color ink drops to individual pixels in the pixel grid to form a given output on the media, each printhead having an active nozzle swath width and a given nozzle resolution based on a distance separating adjacent nozzles as measured along the X axis;

media advance means for periodically moving the media in the X axis direction through the print zone a predetermined number of rows after completion of a printing swath by the carriage in the Y axis direction;

a binary depletion device for on/off masking of individual pixels to minimize horizontal and vertical drop overlap for edge portions of a multicolor figure in the given output and for providing portions of an edge of a figure which are subject to a first depletion mask for horizontal edges, and a second depletion mask for vertical edges; and wherein both said first depletion mask and said second depletion mask include a pattern of "on" pixels in substantially all adjacent rows of the pixel grid for said multicolor figure, but wherein said first depletion mask for horizontal edges is different from said second depletion mask for vertical edges.

2. The printing system of claim 1 which further includes a third depletion mask for corner edges which is different from said first depletion mask for horizontal edges and is different from said second depletion mask for vertical edges.

3. The printing system of claim 1 which further includes a fourth depletion mask for slanted edges which is different from said first depletion mask for horizontal edges and is different from said second depletion mask for vertical edges.

4. The printing system of claim 1 wherein said first depletion mask for horizontal edges includes a pattern of "on" pixels which have no separation between adjacent "on" pixels in the X axis.

5. The printing system of claim 1 wherein said first depletion mask for horizontal edges includes a pattern of "on" pixels separated by at least one "off" pixel in the Y axis.

6. The printing system of claim 1 wherein said second depletion mask for vertical edges includes a pattern of "on" pixels which have no separation between at least some adjacent "on" pixels in the Y axis.

7. The printing system of claim 1 wherein said second depletion maks for vertical edges includes a pattern of "on" pixels separated by at least one "off" pixel in the X axis.

8. The printing system of claim 1 wherein one or more of said plurality of printheads has a given nozzle resolution, and said pixel grid has an X axis resolution with more pixels/inch than said given nozzle resolution.

9. The printing system of claim 1 which further includes a print mask requiring all slant edge pixels and all corner edge pixels for the multicolor figure to be "on" pixels.

10. The printing system of claim 1 wherein at least one of said plurality of printheads has a given nozzle resolution, and said pixel grid has a Y axis resolution with more pixels/inch than said given nozzle resolution.

11. The printing system of claim 1 wherein said media advance means moves the media an odd number of rows between successive printing swaths such that certain adjacent rows are not printed in the same printing swath by the carriage.

12. A method of controlling distribution of ink drops applied by an inkjet printer to an addressable pixel grid of horizontal rows and vertical columns, determining which pixels of a multicolor figure to be printed constitute horizontal edges and which pixels of the multicolor figure constitute vertical edges in order to minimize horizontal drop overlap for edge portions in a same row and to minimize vertical drop overlap for edge portions in a same column;

applying a first depletion mask to horizontal edges of a multicolor figure to be printed;

applying a second depletion mask to vertical edges of the figure to be printed, wherein the second and first depletion masks are different;

applying additional depletion masks to corner edges and slant edges of the figure to be printed, wherein the additional depletion masks are different from the first and second depletion masks.

13. The method of claim 12 wherein the figure is formed by different colored ink drops by the inkjet printer, and further including:

separating the figure into a plurality of different color planes corresponding to the different colored ink drops; and performing one or more of the aforesaid applying steps independently to each different color plane.

14. The method of claim 13 which includes applying an additional depletion mask to slanted edges and corner edges which preserves pixels which are not otherwise depleted by the first depletion mask and the second depletion mask.

15. The method of claim 12 wherein individual pixels are masked on or off by a horizontal edge mask which requires all adjacent pixels in each row to be separated by at least one off pixel in the same row.

16. The method of claim 12 wherein individual pixels are masked on or off by a vertical edge mask which requires all adjacent pixels in each column to be separated by at least one off pixel in the same column.

17. The method of claim 12 including printing the multicolor figure with a multipass print mode such that certain adjacent rows of pixels are not printed in a same pass by the printing system.

18. The method of claim 17 including printing the multicolor figure with a four-pass print mode.

19. The method of claim 12 including printing the multicolor figure with a print mode such that certain adjacent rows of pixels are printed in a same pass by the printing system.

* * * * *